(12) United States Patent
Ohtsuka et al.

(10) Patent No.: US 6,305,775 B1
(45) Date of Patent: Oct. 23, 2001

(54) INK-JET PRINTING METHOD AND APPARATUS THEREFOR

(75) Inventors: Naoji Ohtsuka, Yokohama; Kiichiro Takahashi, Kawasaki; Hitoshi Nishikori, Inagi; Osamu Iwasaki, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/881,273

(22) Filed: Jun. 24, 1997

(30) Foreign Application Priority Data

Jun. 28, 1996 (JP) .................................................... 8-170389

(51) Int. Cl.⁷ ........................... B41J 29/38; B41J 29/393; B41J 2/145; B41J 2/14
(52) U.S. Cl. ................... 347/15; 347/9; 347/19; 347/40; 347/48
(58) Field of Search ................. 347/15, 48, 19, 347/56, 9, 13, 14, 24, 37, 40, 43, 183, 23, 3

(56) References Cited

U.S. PATENT DOCUMENTS

| | | | |
|---|---|---|---|
| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | * 7/1984 | Ayata et al. | 347/56 |
| 4,533,928 | * 8/1985 | Sugiura et al. | 347/3 |
| 4,558,333 | 12/1985 | Sugitani et al. | 346/140 |
| 4,673,951 | * 6/1987 | Mutoh et al. | 347/15 |
| 4,723,129 | 2/1988 | Endo et al. | 346/1.1 |
| 4,740,796 | 4/1988 | Endo et al. | 346/1.1 |
| 6,106,102 | * 8/2000 | Richtsmeier et al. | 347/41 |

FOREIGN PATENT DOCUMENTS

| | | |
|---|---|---|
| 2 602 462 | 8/1986 | (FR) . |
| 54-56847 | 5/1979 | (JP) . |
| 59-123670 | 7/1984 | (JP) . |
| 59-138461 | 8/1984 | (JP) . |
| 60-71260 | 4/1985 | (JP) . |
| 7-323550 | 12/1995 | (JP) . |
| 7-323552 | 12/1995 | (JP) . |

* cited by examiner

*Primary Examiner*—John Barlow
*Assistant Examiner*—Charles W. Stewart, Jr.
(74) *Attorney, Agent, or Firm*—Fitzpatrick, Cella, Harper & Scinto

(57) ABSTRACT

Each nozzle of an ink-jet head has heaters having different heating capacities, and in accordance with the heater driven, a diameter of an ink dot formed by ink which is discharged from the nozzle is changed, thereby printing a large dot or a small dot. When multi-value image data is inputted, the multi-value image data is modulated such that a pixel having high density is printed with both the large dot and small dot. On the basis of the modulated print data, any of the heaters included in each nozzle of the ink-jet head is driven, whereby printing an image having tones based on the multi-value image data.

16 Claims, 26 Drawing Sheets

FIG. 14

| 2-BIT INPUT | DECODED OUTPUT |
|:---:|:---:|
| 00 | ✕ ✕ |
| 01 | ✕ ◯ |
| 10 | ◯ ◯ |

212

FIG. 18
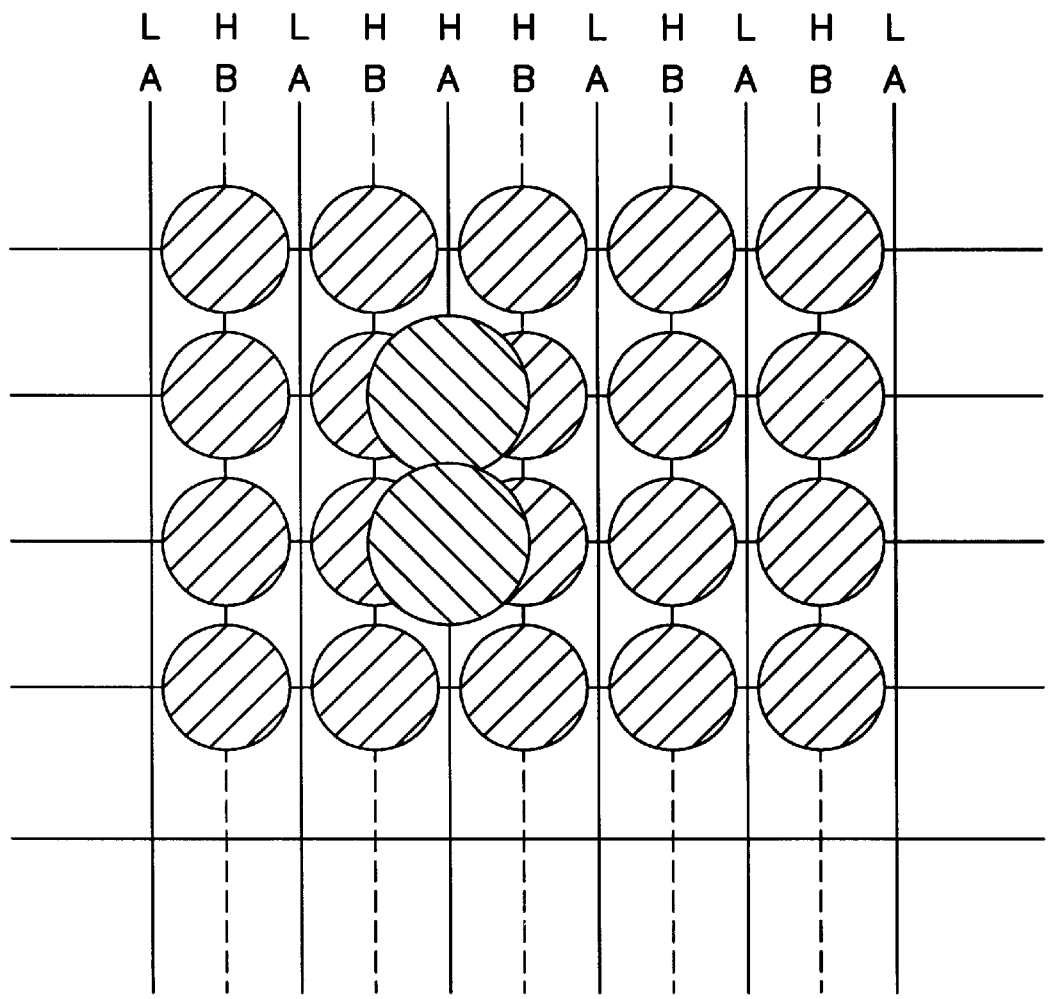
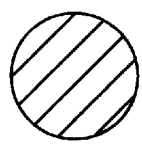 :SMALL DOT
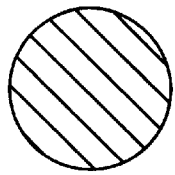 :LARGE DOT

FIG. 19
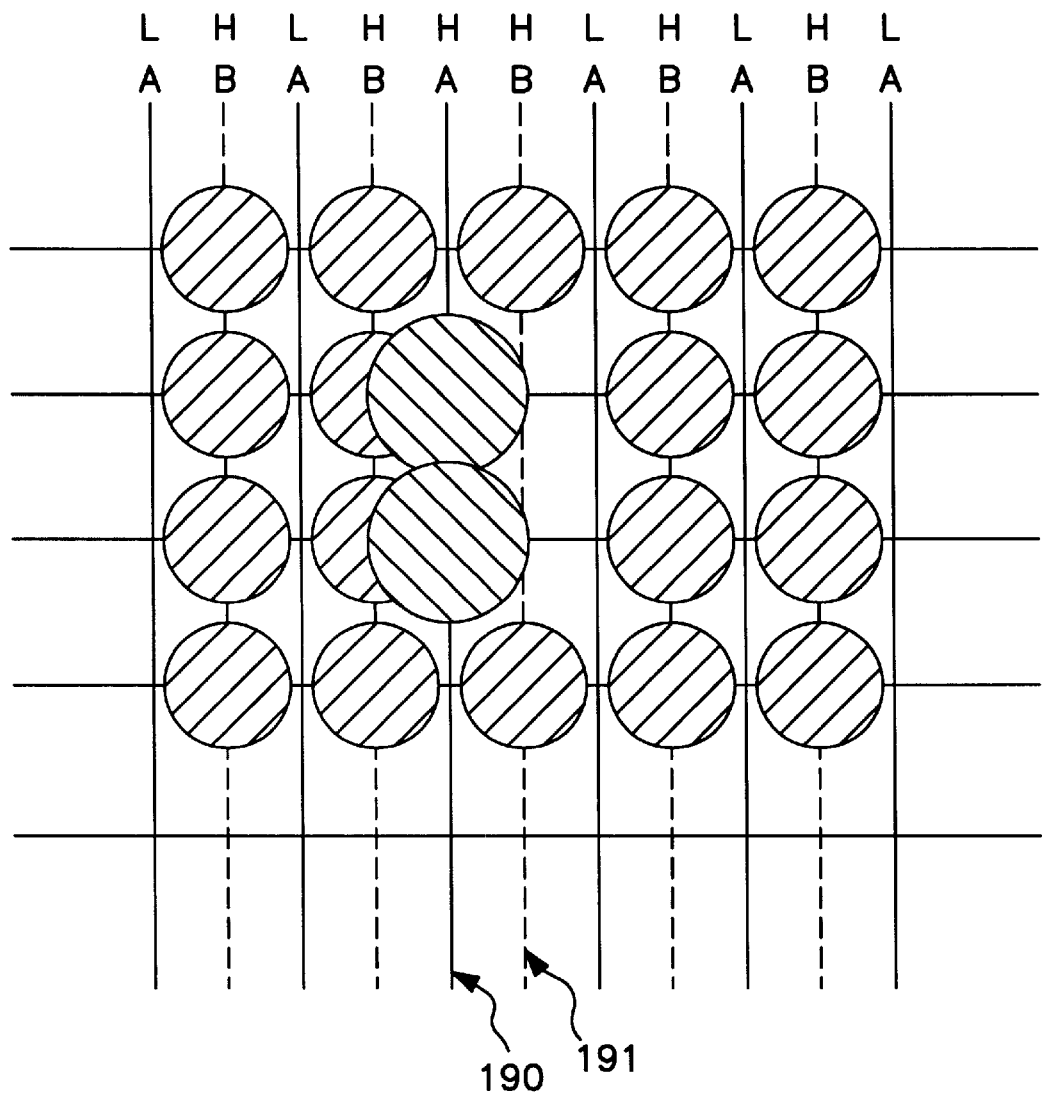
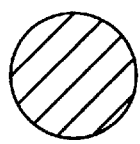 : SMALL DOT
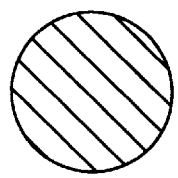 : LARGE DOT

FIG. 21
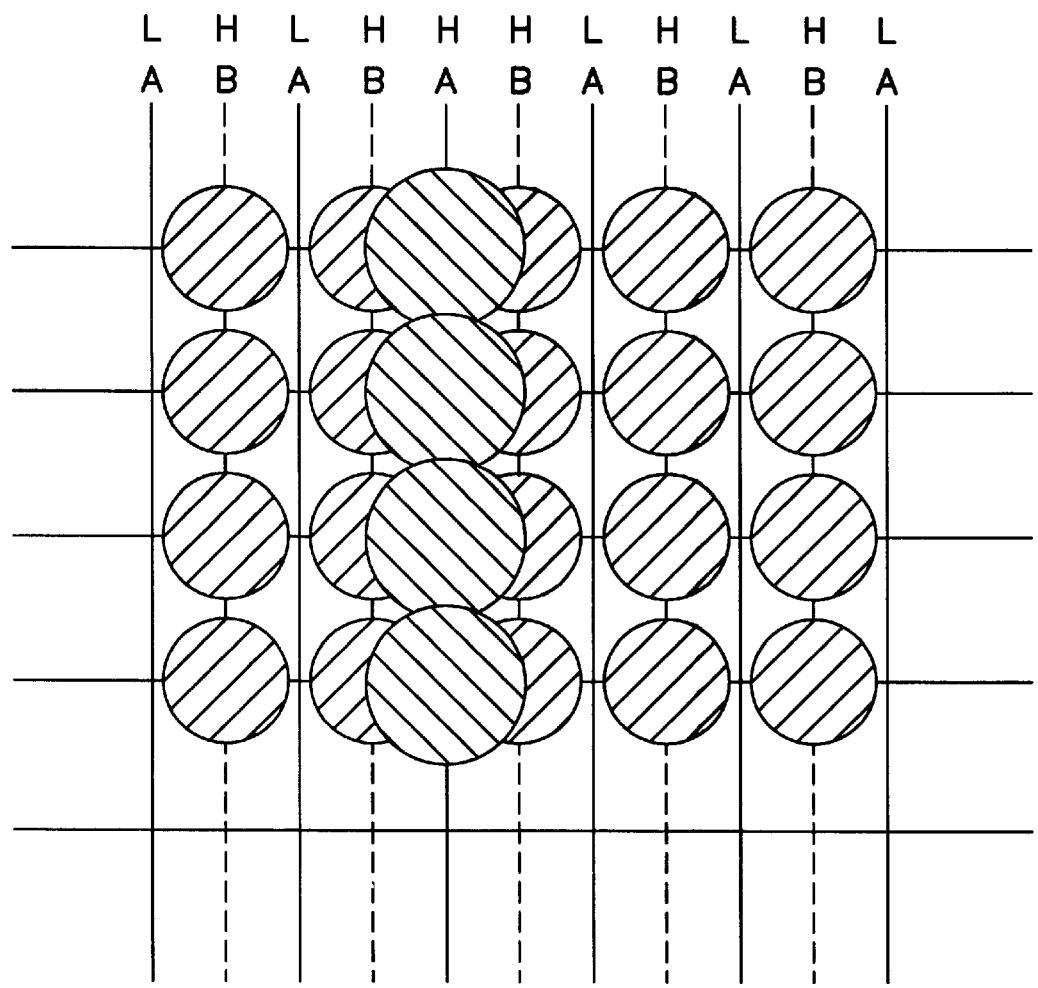
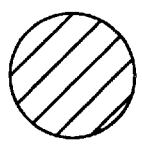 :SMALL DOT
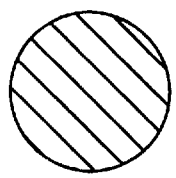 :LARGE DOT

FIG. 23
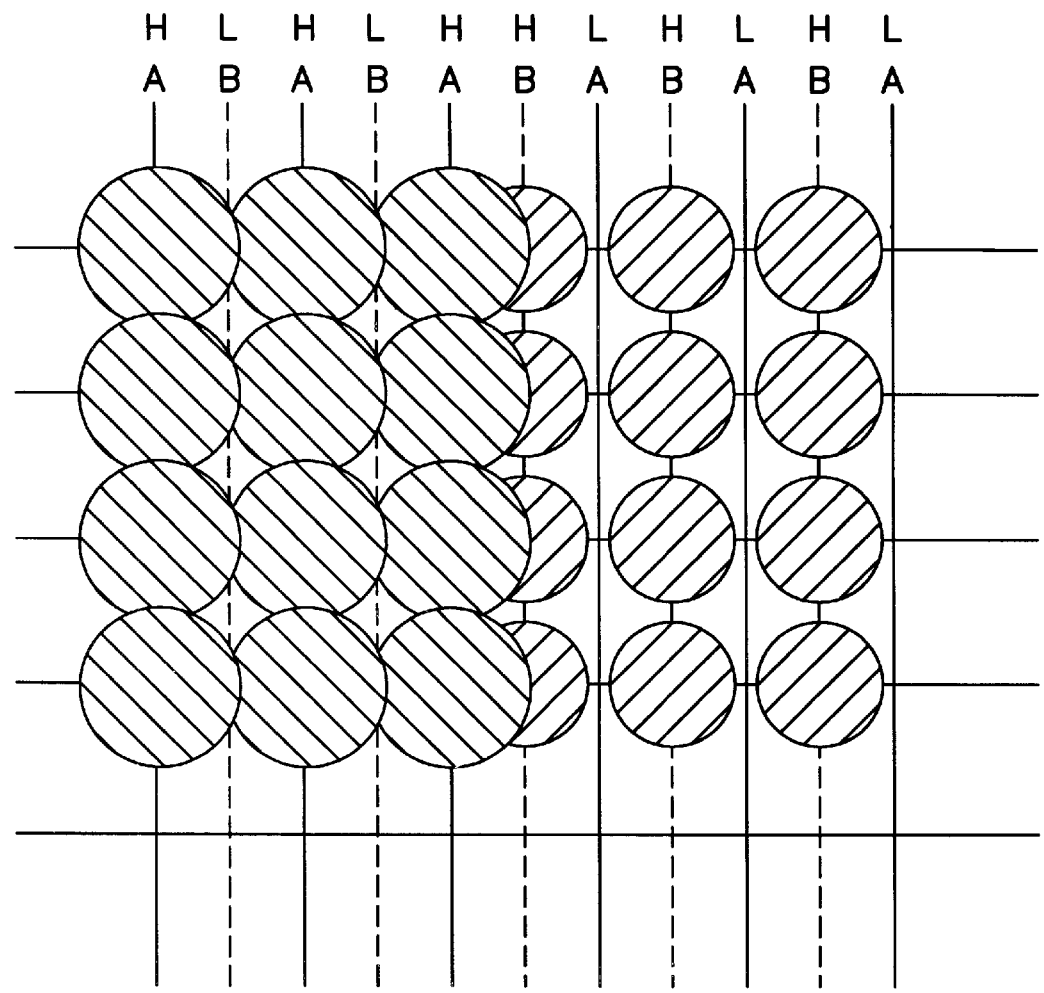
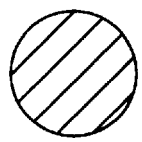 :SMALL DOT
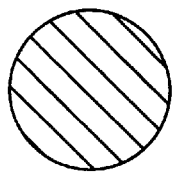 :LARGE DOT

INK-JET PRINTING METHOD AND APPARATUS THEREFOR

BACKGROUND OF THE INVENTION

The present invention relates to an ink-jet printing method and apparatus therefor for printing by discharging ink from a printhead onto a print medium.

A printing apparatus such as a printer, copy machine, facsimile or the like is constructed to print dots on a print medium e.g. a sheet of paper or a thin plastic plate or the like, with the use of each of printing elements (nozzles, heating elements, wire and the like), and to form an image consisting of these dots. The printing apparatus of this type can be classified by the printing system, such as the ink-jet printing system, wire-dot printing system, thermal printing system, laser beam printing system and the like. The ink-jet printing system (ink-jet printer) is structured to discharge ink drops (printing liquid) from orifices of a printhead to a print medium, thereby printing an image.

Along with the recent growth in the number of printing apparatuses used as output terminals of personal computers or image processing apparatuses, demands are high for achieving quick printing, high resolution, high image quality, low noise and so on. The aforementioned ink-jet printer has been provided to satisfy such demands. Since the ink-jet printer performs printing by discharging ink from a printhead, it is possible to realize printing without contacting the print medium, making it possible to stabilize image quality.

Owing to the recent development in various digital cameras, digital videos, CD-ROM or the like, pictorial image data can be readily processed utilizing an application program on a host computer. As a result, printers serving as output units of such computers are required to have the capability to output pictorial images as well. Conventionally, outputting operation of a pictorial image was performed by a printing apparatus adopting the silver salt printing system which is an advanced printing apparatus for inputting a digital image, or sublimation printing system which is an expensive printing apparatus dedicated to output photographs using sublimation dye.

Such printing apparatus used conventionally to print photographic images or the like was extremely expensive. One of the reasons is in that the silver salt printing system requires extremely complicated processes and that the apparatus was so large that it cannot be used as a desk-top device. Also with respect to the apparatus using sublimation dye, as the size of a print medium becomes large, the cost for the main unit and running cost become extremely high. Therefore, individuals could not use these apparatuses with ease. In addition, the largest disadvantage of these apparatuses is that these apparatuses are designed to use a particular print medium. In other words, the type of a print medium a user can use is limited. Since a regular sheet of paper is normally used to print documents or graphics or the like in a personal home or general business environment, color photographic images are difficult to print since they require a special sheet to print pictorially.

The ink-jet printer is known as a printing apparatus that minimizes such limitation related to a print medium. In order to cope with the disadvantage, the ink-jet printer has lately provided a type that can print a color photographic image with great improvement in its image quality, by improving image processes, colorant and print medium or the like.

In addition, to improve tonality of color graphics in a color image output, various techniques have been suggested. Various improvements have been suggested and made available in late years. For instance, resolution is relatively increased from a normal print mode to improve drawing capability, or resolution of a printing apparatus is increased to send multi-value image data as print data to a printing apparatus, to print multi-value image utilizing sub-pixels.

Furthermore, a printing method realized by changing the amount of ink discharged from a printhead is available. According to this method, the amount of ink discharge is uniformly and relatively decreased in a high-resolution mode. Moreover, a printhead which can arbitrarily modulate the amount of ink discharged from each nozzle has been suggested.

However, the above-described conventional method raises the following problems.

In the printing method of uniformly decreasing the discharging amount of ink, printing is performed with increased resolution in each of the main-scanning direction and sub-scanning direction. Therefore, the number of times of scanning in the main-scanning direction increases and the distance that a print medium is conveyed in the sub-scanning direction decreases per one scanning. Accordingly, print speed largely declines. In addition, the amount of data increases as the resolution of print data is raised, resulting in great increase in memory capacity for storing the print data, an increased amount of transfer data and transfer time at an interface, and an increased load in a printer driver. For instance, if resolution of the print data is raised twice as high, the amount of print data increases twice as much in both the main-scanning and sub-scanning directions, resulting to increase the amount of data to a square of two, i.e. four times as much. Moreover, in terms of an outputted image, a diameter of a dot in the image is reduced to a minute size in order to decrease granularity (sense of roughness) in a dark portion of the image. Thus, even in an image portion having a light color where granularity is inconspicuous, a large number of the fine dots are similarly printed. As a whole, printing efficiency is poor despite the improved image quality.

Another method of printing is to utilize mixture of large dots having long diameter and small dots having short diameter. According to this method, poor print efficiency in image forming can be improved. This method is feasible in a case where a single nozzle is provided for each color; however, in a case where a plurality of nozzles are provided for each color, it becomes difficult to realize, and the larger the number of nozzles, the more difficult to realize. Normally, each nozzle discharges ink drops with frequency of several KHz or more. If the number of nozzles is small, the ink discharge operation can be controlled directly by a CPU. However, as the number of nozzles increases, the ink discharge needs to be controlled in terms of processing speed by hardware along with hardware circuits such as a gate array or the like. Note that in order to modulate the discharging amount of ink by making use of large dots and small dots, a driving pulse for discharge is modulated, or plural driving elements for large dots and small dots are provided for each nozzle to be driven alternatively.

To switch the plural driving elements as in the latter case, registers must be provided for printheads for large dots and small dots respectively. In this case, the necessary number of registers is integral multiples of the printing resolution. Therefore, the scale of the printhead circuit becomes large and cost for a printhead becomes high. Meanwhile, to modulate a driving pulse as in the former case, separate driving signal lines are necessary for controlling driving operation of each of the nozzles. Therefore, one signal line which is normally sufficient for driving nozzles would be increased to several hundreds lines (corresponding to the number of nozzles). As a result, the number of contacts (contact point), the number of flexible cables connected to printheads, the number of driver transistors for printing elements also increase, causing cost increase by a great deal.

Instead of achieving printing with the mixture of large dots and small dots by one scanning of a printhead, printing operation can be realized by plural scanning operation, combining scanning for printing large dots and scanning for printing small dots. According to this method, it is possible to generate an image having the mixture of large dots and small dots with a simple construction. However, this method always requires plural times of scanning operation (hereinafter referred to as multiple pass printing). For instance, even if small dots are printed for almost all addresses in single scanning and there is only one large dot in the single scanning line, scanning operation must be performed twice to print that one large dot. In addition, as the number of times of multiple pass printing increases, the printing requires longer time in reality. Therefore, the number of times of multiple pass printing must be minimized. However, a problem arises herein. Assume that printing operation is performed in two pass to form gradation ranging from a low-density portion (thin: white) to a high-density portion (thick). Herein, it is assumed that printing starts from the low-density portion. The portion where a color (including gray scale) starts to appear is printed with the smallest dots. Then as it comes to a portion having a higher density in the image, a number of small dots are printed by the printhead on a printable grid point (virtual print-dot position). When all the small dots are printed in the above manner, the mixture of small dots and large dots are then used to print the image. As it comes to a portion having even higher density in the image, large dots are further printed to form the highest density portion.

Herein, print control in the printing apparatus is executed by switching between the printing operation with large dots and the printing operation with small dots for each scanning operation. When printing is performed in such condition described above, a problem occurs in that, in a case where small dots are printed in all the printable grid points, meaningless scanning must be executed for printing a large dot even if there is no large dot to be printed. In addition, when 100% of the printing processing is executed by one of two scanning (small dots), the advantage of divided printing, that is, the characteristic of multiple pass printing which enables to solve the problems such as an uneven amount of ink discharged from a nozzle or an unequal amount of paper conveyance, cannot be attained. Furthermore, since the ratio of printing amount is not equal for each scanning operation, problems arise in that an error rate is not decreased in scanning operation having a high printing ratio, or that electricity consumption is not reduced since the scanning operation having a high printing ratio consumes high instantaneous electricity.

SUMMARY OF THE INVENTION

The present invention has been made in consideration of the above situation, and has as its object to provide an ink-jet printing method and apparatus therefor which can print an image in different tones in accordance with print data.

The object of the present invention is to modulate the amount of ink discharge in order to form dots having different diameters, and to supply print data at the timing synchronous to the ink discharge timing of forming a desired dot's diameter, thereby enabling to modulate dot's diameter in one scanning operation with a simple construction of the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention, and together with the description, serve to explain the principles of the invention.

FIG. 14 is an explanatory view showing data in a two-bit decode table;

FIG. 18 shows a printed example according to the present embodiment;

FIGS. 19 and 20 are an explanatory view for explaining inconvenience of the conventional printing method;

FIG. 21 shows a printed example according to the present embodiment;

FIG. 23 shows a printed example according to the present embodiment;

DETAILED DESCRIPTION OF THE PREFERRED EMBODIMENT

Preferred embodiment of the present invention will be described in detail in accordance with the accompanying drawings.

Figure 1:
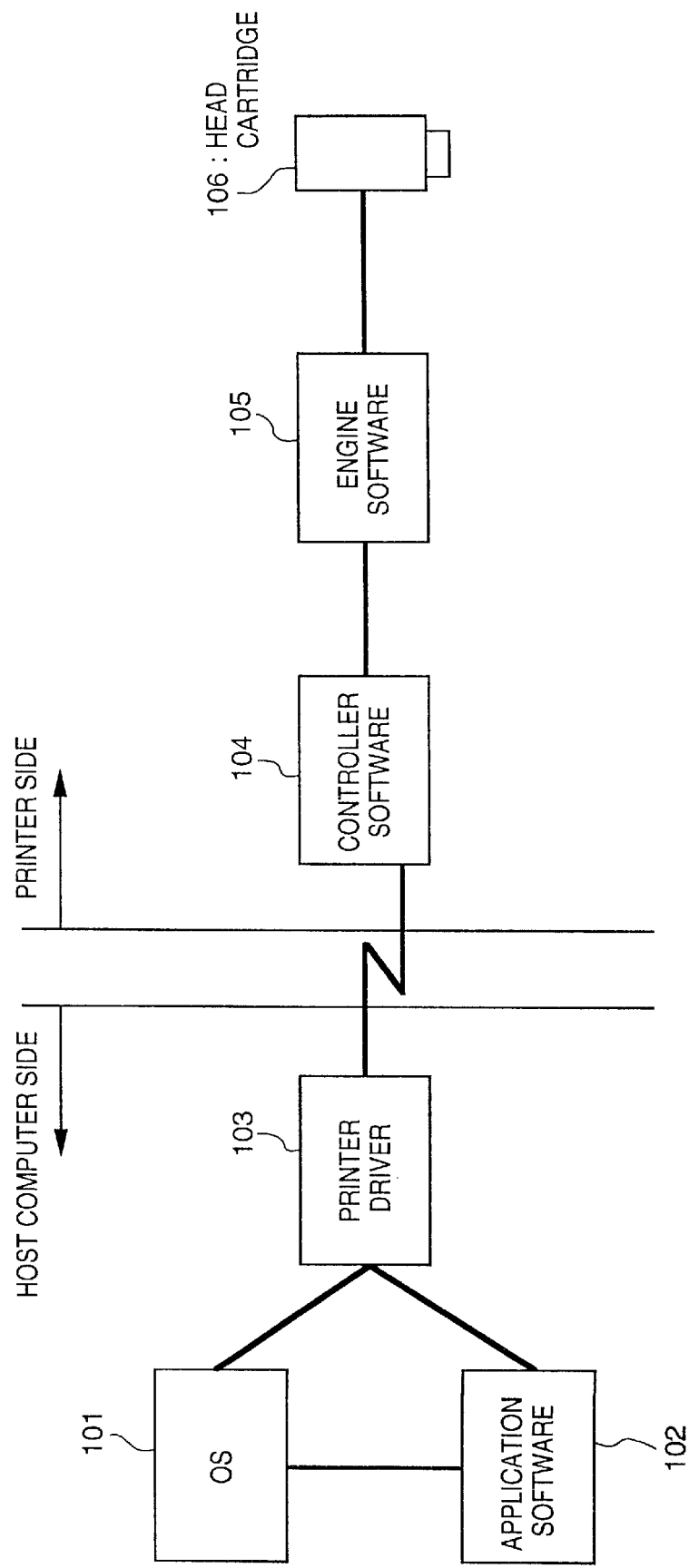
FIG. 1 is a block diagram showing arrangement of a print system as an embodiment of the present invention, including a host computer and a printing apparatus.

FIG. 1 is a block diagram showing the arrangement of a print system as the embodiment of the present invention.

Referring to FIG. 1, the print system is constructed such that a host computer performs processing of various data with an application software 102 which generally works on an OS (operating system) 101. Hereinafter, description will be provided on data flow in a case where image data generated by the application software 102 for handling pictorial images is outputted to a printer via a printer driver 103.

Image data processed by the application software 102 is, if the image data is a pictorial image, sent to the printer driver 103 as multi-valued R, G and B data. The printer driver 103 performs color processing on the multi-valued R, G and B data received from the application software 102, then further performs half-tone processing, and converts the data to C, M, Y and K data normally having binary value. The converted image data is outputted via a printer interface in the host computer, or via an interface to a memory unit such as files or the like. In FIG. 1, image data is outputted to the printer via an interface to the printer.

At the printer in FIG. 1, the image data is received, being controlled by controller software 104 and the received image data is sent to engine software 105 after checking conformability to a print mode and an ink-jet cartridge (head cartridge 106). The engine software 105 receives the image data containing a print mode and data structure designated by the controller software 104, generates an ink-discharging pulse in accordance with the image data and outputs the pulse to the head cartridge 106. As a result, the head cartridge 106 discharges respective color ink and prints a color image, corresponding to the image data, on a print medium. Note that the head cartridge 106 incorporates ink tanks containing respective colors of ink integrated with a printhead.

Figure 2:
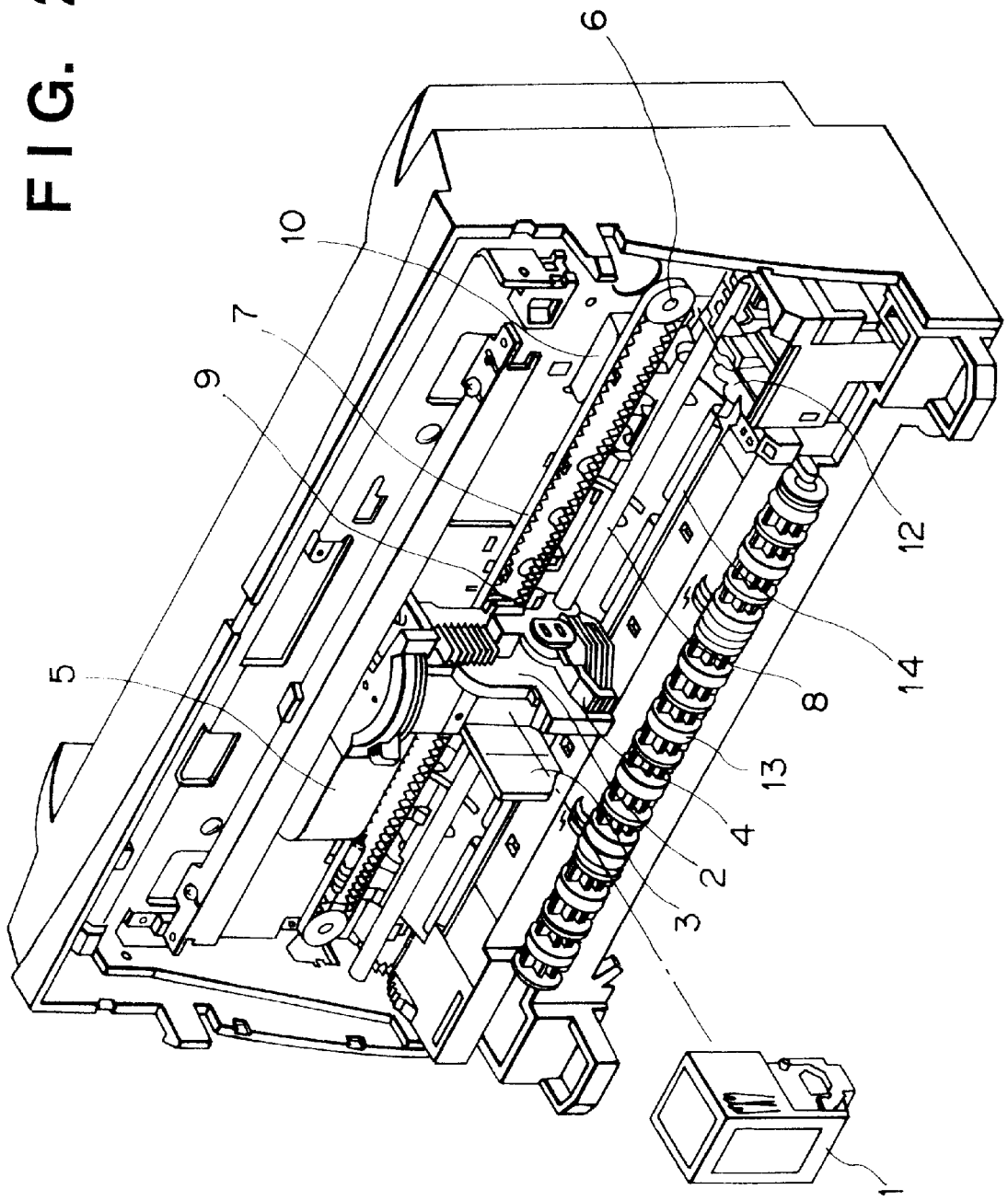
FIG. 2 is a perspective view showing a print unit of the printing apparatus according to the present embodiment.

FIG. 2 is a drawing which shows a mechanical structure of a cartridge-exchangeable type ink-jet printing apparatus, which is the preferable embodiment of the present invention. FIG. 2 shows the condition where a front cover of the ink-jet printing apparatus is removed to reveal the internal structure of the apparatus.

Referring to FIG. 2, Reference numeral 1 denotes an exchangeable-type head cartridge (corresponding to 106 in FIG. 1) comprising ink-tank units for containing ink and printheads. Reference numeral 2 denotes a carriage unit for performing printing by reciprocal movement while loading the head cartridge 1. Reference numeral 3 denotes a holder which stabilizes the head cartridge 1 and moves in correspondence with a cartridge stabilizing lever 4. More specifically, the cartridge stabilizing lever 4 is activated after the head cartridge 1 is loaded on the carriage unit 2, thereby tightly securing the head cartridge 1 to the carriage unit 2. On account of this, position of the head cartridge 1 is determined, and electrical contact between the head cartridge 1 and carriage unit 2 is achieved. Reference numeral 5 denotes a flexible cable for transmitting electrical signals to the carriage unit 2. Reference numeral 6 denotes a carriage motor whose rotation enables to reciprocally move the carriage unit 2 in the main-scanning direction. Reference numeral 7 denotes a carriage belt moved by the carriage motor 6 to horizontally move the carriage unit 2. Reference numeral 8 denotes a guide shaft for slidably supporting the carriage unit 2. Reference numeral 9 denotes a home position sensor comprising a photocoupler for determining a home position of the carriage unit 2. Reference numeral 10 denotes a shading plate used to detect the home position. When the carriage unit 2 reaches the home position, the shading plate shades the photocoupler provided in the carriage unit 2, whereby detecting that the carriage unit 2 has reached the home position. Reference numeral 12 denotes a home position unit including a printhead recovery mechanism for the printhead of the head cartridge 1. Reference numeral 13 denotes a paper discharge roller which holds a print medium with a spur unit (not shown) and discharges the print medium out of the printing apparatus. Reference numeral 14 denotes an LF unit which conveys a print medium for a predetermined amount in the sub-scanning direction.

Figure 3:
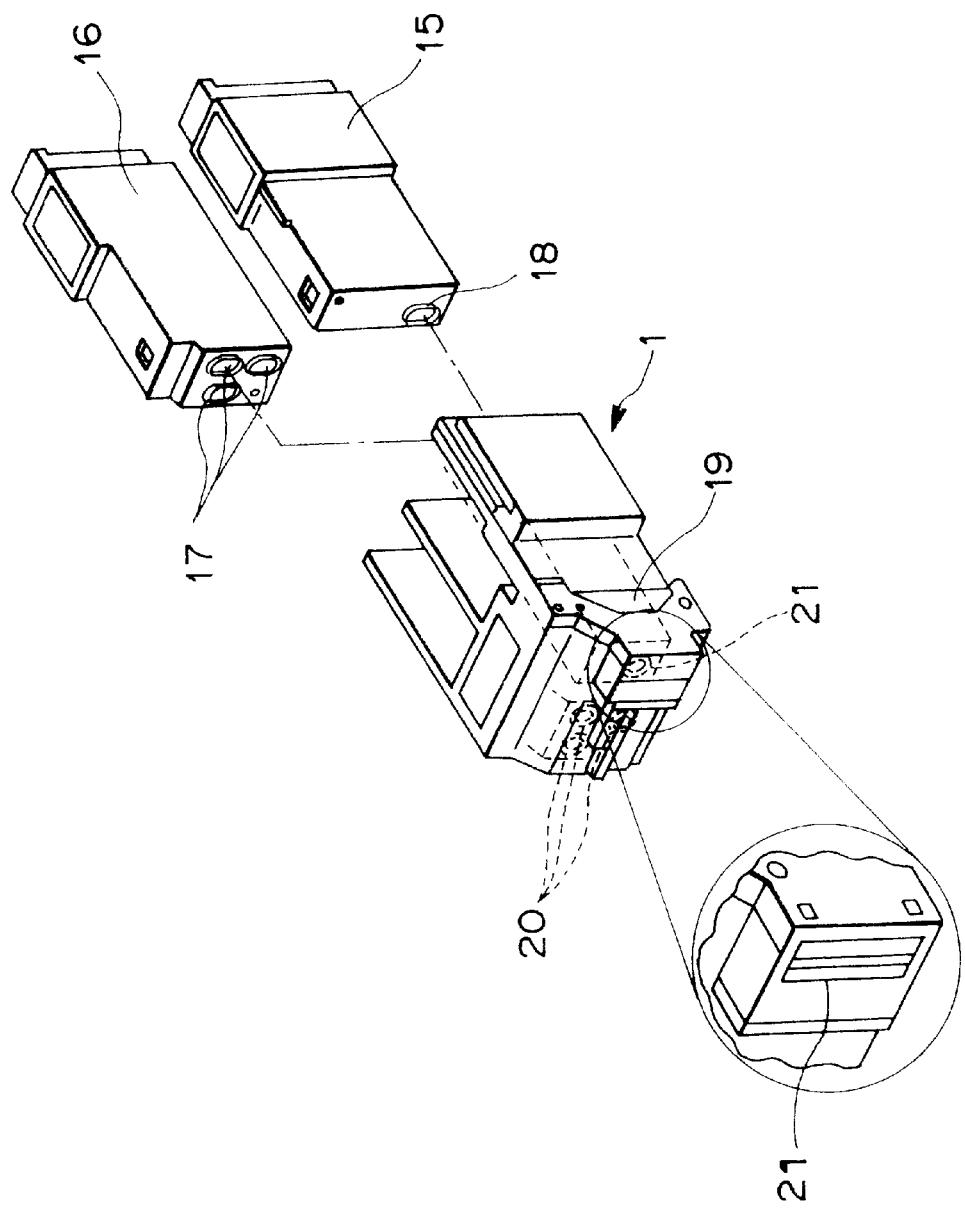
FIG. 3 is a perspective view showing arrangement of a head cartridge in the present embodiment.

FIG. 3 shows details of the head cartridge 1 used in the present embodiment. In FIG. 3, Reference numeral 15 denotes an exchangeable ink tank for black (Bk); and 16, an exchangeable ink tank containing ink for C, M and Y color ink. Reference numeral 17 denotes connection openings (color toner supply orifice) of the ink tank 16 which supply color toner (ink) coupled with the head cartridge 1; and 18, a connection opening of the ink tank 15. The ink supply orifices 17 and 18 are connected to supply tubes 20 to supply each color ink to a printhead unit 21 having Y, M, C and Bk printheads. Reference numeral 19 is a contact portion of electrical signals, and is connected to the flexible cable 5 (FIG. 2) to transmit various signals to the head cartridge 1.

Figure 4:
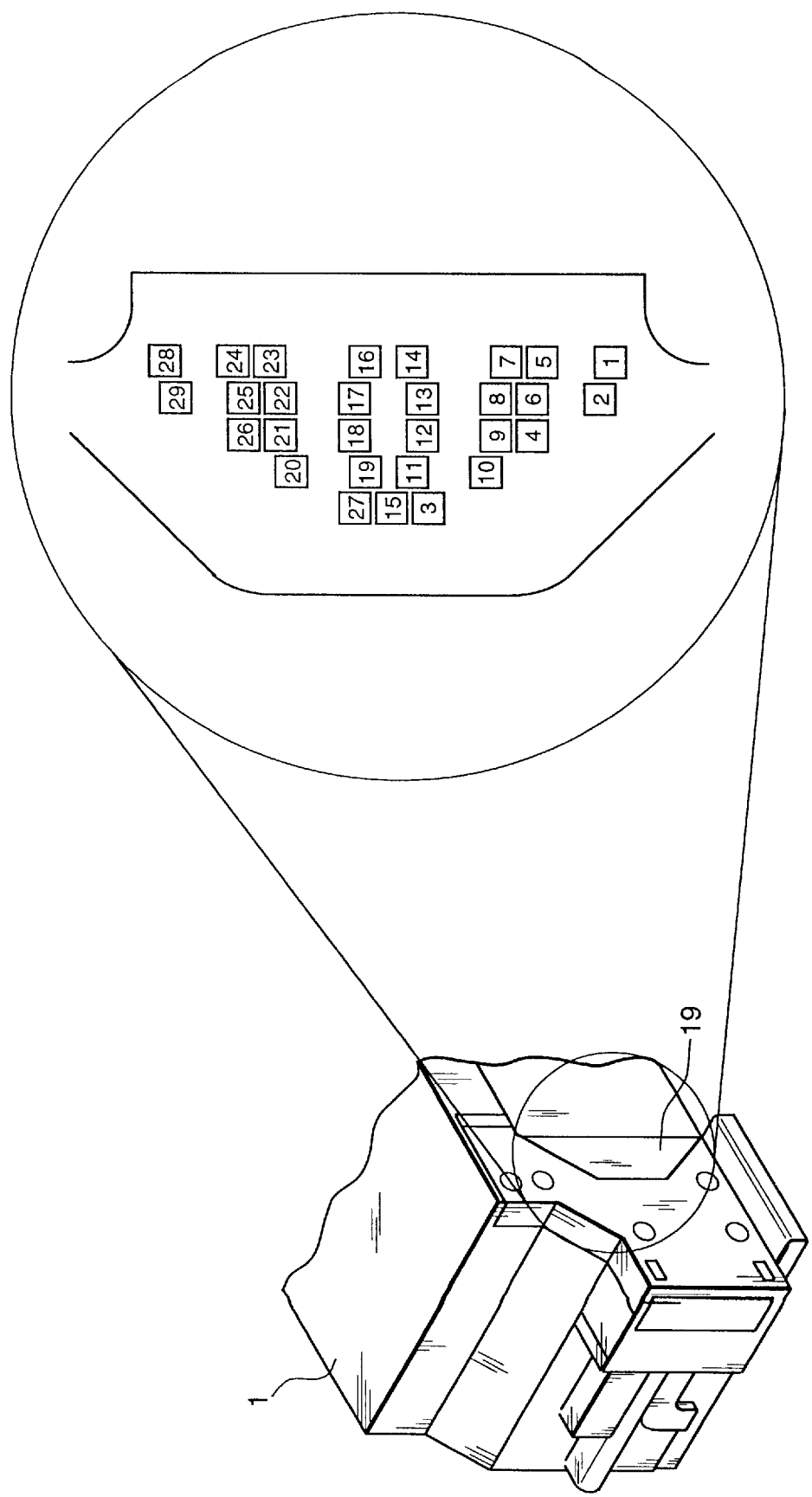
FIG. 4 is a drawing showing an electrically-connected section of the head cartridge and printing apparatus according to the present embodiment.

FIG. 4 shows details of the contact portion 19 of the head cartridge 1. In the contact portion 19, a plurality of electrode pads are mounted, through which signals related to ink discharge or ID signals for recognizing head cartridge 1 or the like are exchanged with the main unit of the ink-jet printing apparatus.

Furthermore, by checking the conductive state through the contact portion 19 shown in FIG. 4, it is possible to detect whether or not the head cartridge 1 has been changed.

Figure 5:
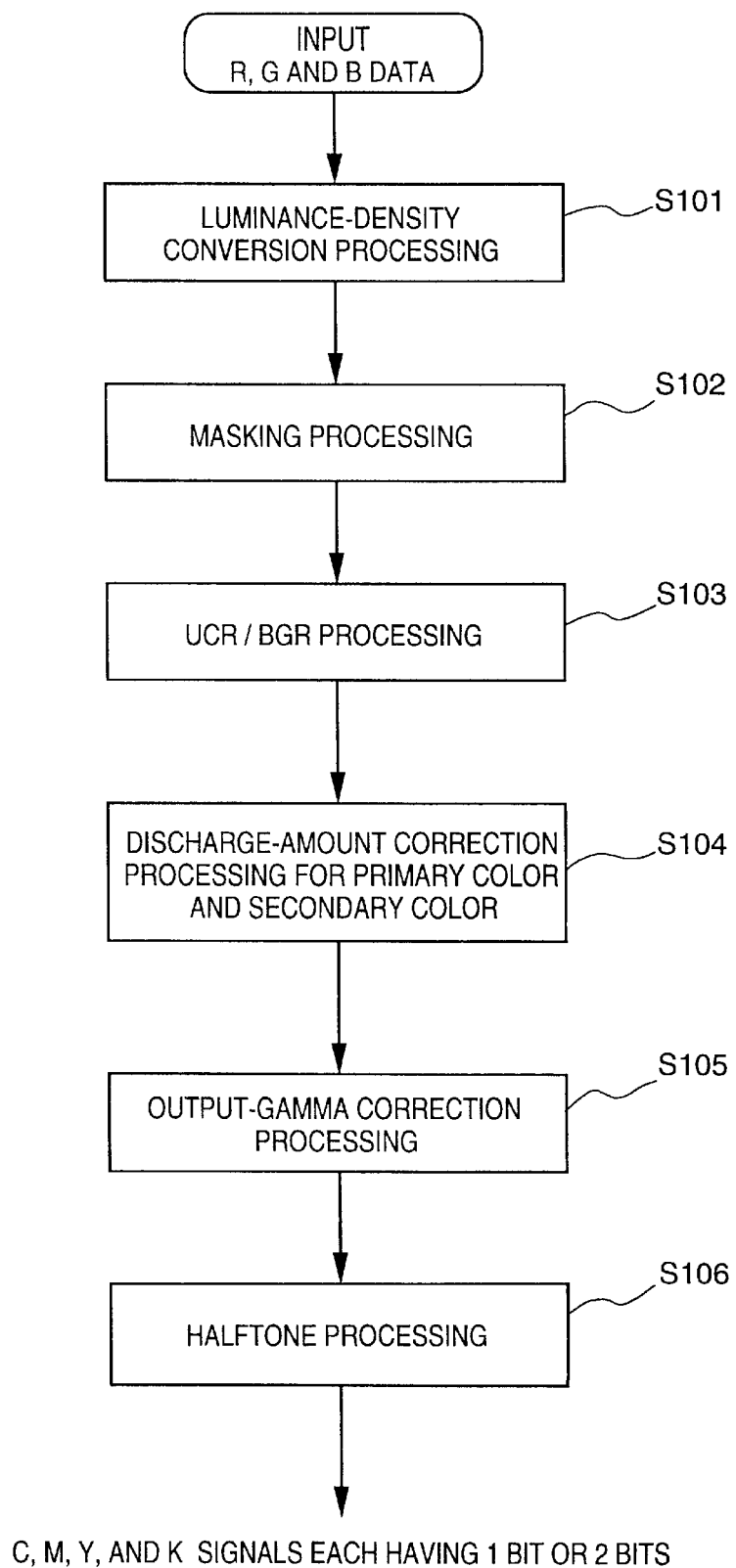
FIG. 5 is a flowchart showing processing of print data in a printer driver according to the present embodiment.

FIG. 5 is a flowchart showing image processing performed by an image processing module in the printer driver 103.

In step S101, luminance-density conversion is performed to convert R, G and B luminance signals, that is, 24-bit input signals each of R, G and B having 8 bits, into C, M and Y signals, that is, 24-bit signals each of C, M and Y having 8 bits, or 32-bit signals each of C, M, Y and K having 8 bits. Next in step S102, masking processing is performed, correcting unnecessary color component in the C, M and Y color ink. Next in step S103, UCR/BGR processing is performed to remove under colors and extract black component. In step S104, primary color (R, G and B) and secondary color (C, M and Y or C, M, Y and K) are limited to different discharging amount with respect to each pixel. Herein, primary color is limited to 300%; and secondary color, 400%.

Next in step S105, gamma correction is performed such that the characteristic of an output is linear. Up to this point, processing is performed on multi-value data each color having 8 bits. Next in step S106, the 8-bit signals are subjected to half-tone processing and each of the C, M, Y and K color data is converted to signals having 1 bit or 2 bits. Half-tone processing in step S106 can be performed by error-diffusion method, dither method or the like.

Figure 6:
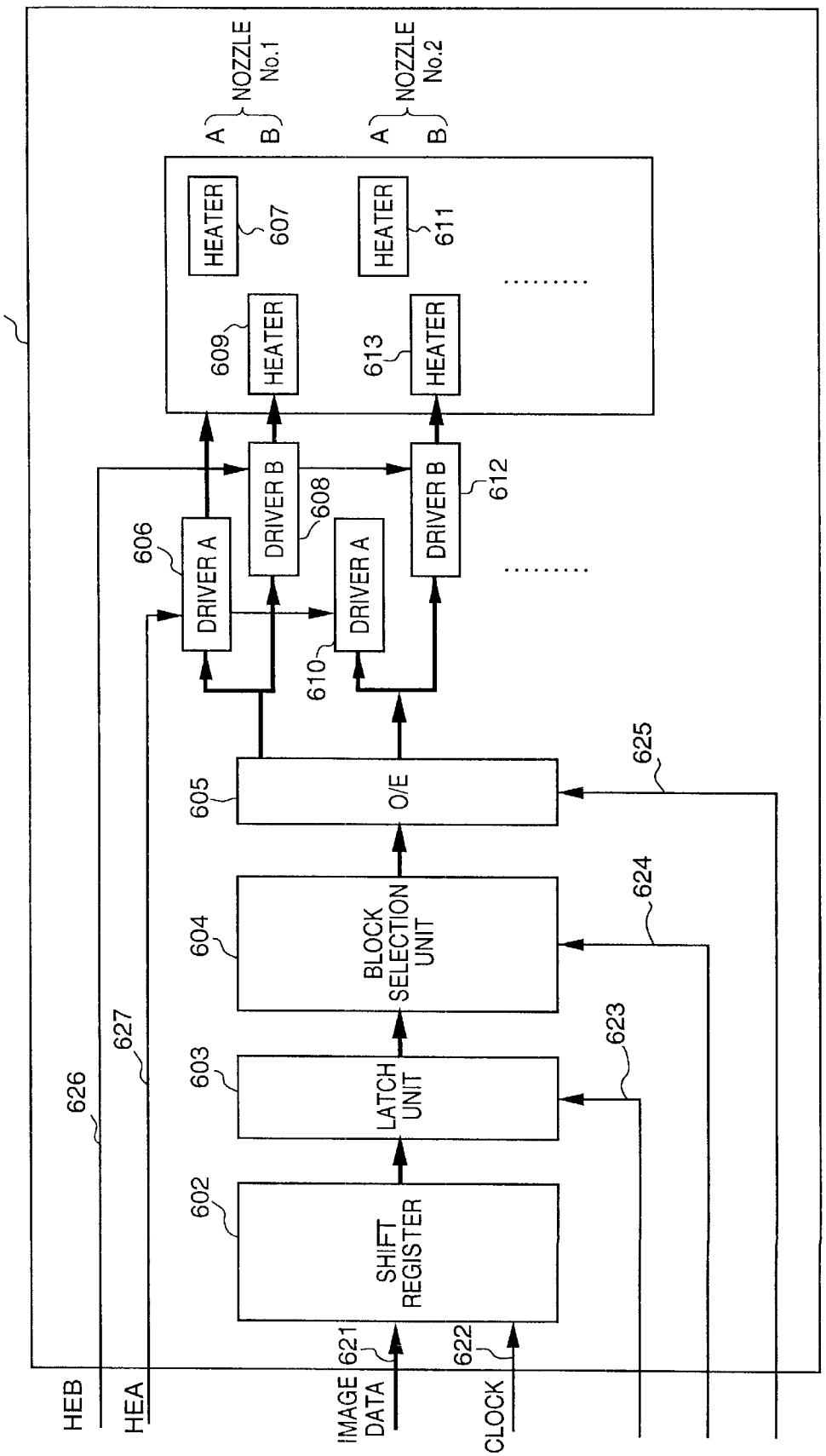
FIG. 6 is a block diagram showing arrangement of a circuit on a substrate of the head cartridge according to the present embodiment.

FIG. 6 shows the arrangement of the circuit and the flow of signals in the head cartridge 1 of the printing apparatus according to the present embodiment. Particularly noted herein is that one nozzle has two heaters for discharging ink and that each of the heaters generates different amount of heat. By switching over the heater to be driven, the size of discharging ink drops (i.e. dot size to be printed) is changed. This printing method will be described later.

Referring to FIG. 6, reference numeral 601 denotes a heater board of the head cartridge 1. Image data 621 subjected to printing is serially transmitted from the main unit of the printing apparatus to the heater board 601 in synchronization with a clock signal 622. The serial image data 621 is maintained by a shift register 602 in synchronization with the shift clock signal 622. When all serial data which is to be printed in a single scan is transferred to the shift register 602 and maintained, a latch signal 623 is outputted by the main unit of the printing apparatus, whereupon the data maintained in the shift register 602 is latched by a latch unit 603 in synchronization with the latch signal 623. Next, the image data stored in the latch unit 603 is divided into specified groups by various methods so that dots are dispersedly distributed to each of the groups. In accordance with a block-selection signal 624, an output of the latch unit 603 is selected and outputted to each heater driver. Reference numeral 605 denotes an odd/even selector which selects to drive either the nozzles having odd numbers in the printheads or the nozzles having even numbers. As an example of the arrangement of the printhead, two heaters A and B respectively for a large dot and a small dot are provided for one nozzle. When the amount of ink discharged from each nozzle is to be changed, the heater to be utilized is switched. As another example of the arrangement of the printhead, plurality of heat resistance units (heaters) may be provided for one nozzle. Among these plurality of heat resistance units, the number of the heat resistance units to be driven at substantially the same time is altered to change the amount of heat energy to be generated, thereby modulating the amount of ink discharged from each nozzle.

Note that according to the present embodiment, the shift register 602 and latch unit 603 have the same number of bits as the number of the nozzles. Printing operation corresponding to one array of head nozzles is performed in two cycles; first, data corresponding to large dots and small dots to be printed in the first printing cycle is stored in the shift register 602 and latch unit 603, and then data corresponding to large dots and small dots to be printed in the second printing cycle is stored in the shift register 602 and latch unit 603. However, the shift register 602 and latch unit 603 may respectively store the number of bits, twice as many as the number of nozzles (when one pixel consists of two bits).

With the above arrangement, various methods may be considered to control the size of a dot to be printed. Taking the nozzle No. 1 (FIG. 6) as an example, when a heater 607 is driven by a heat enabling signal (HEA) 627 sent via a driver A606, a large amount of ink is discharged by the nozzle No. 1, whereby forming a large dot. When a heater 609 is driven by a heat enabling signal (HEB) 626 sent via a driver B608, a small amount of ink is discharged by the nozzle No. 1, whereby forming a small dot. With respect to the nozzle No. 2, similarly, when a heater 611 is driven by a driver A610, a large dot is formed; and when a heater 613 is driven by a driver B612, a small dot is formed.

With the foregoing arrangement, conditions to be satisfied to print a dot at a specified position of a print medium are as follows:

(1) A bit corresponding to each print data which corresponds to each nozzle latched in the latch unit 603 is "1" (data exist);

(2) The bit corresponds to the block selected by the block-selection signal 624;

(3) A selection signal 625 indicative of the odd/even-number of nozzles corresponds to a nozzle position; and (4) A corresponding heat enabling signal 626 or 627 is inputted.

When the above four conditions are satisfied, the corresponding nozzle's heater A or B is driven, whereby either a large dot or a small dot is outputted from the subject nozzles. In other words, the inputted heat enabling signal, either HEB signal 626 or HEA signal 627, decides the dot's diameter of an ink drop to be discharged from the nozzle, and the block timing at which the print data is turned to high level ("1") decides which positions the large and small dots are to be discharged.

Figure 7:
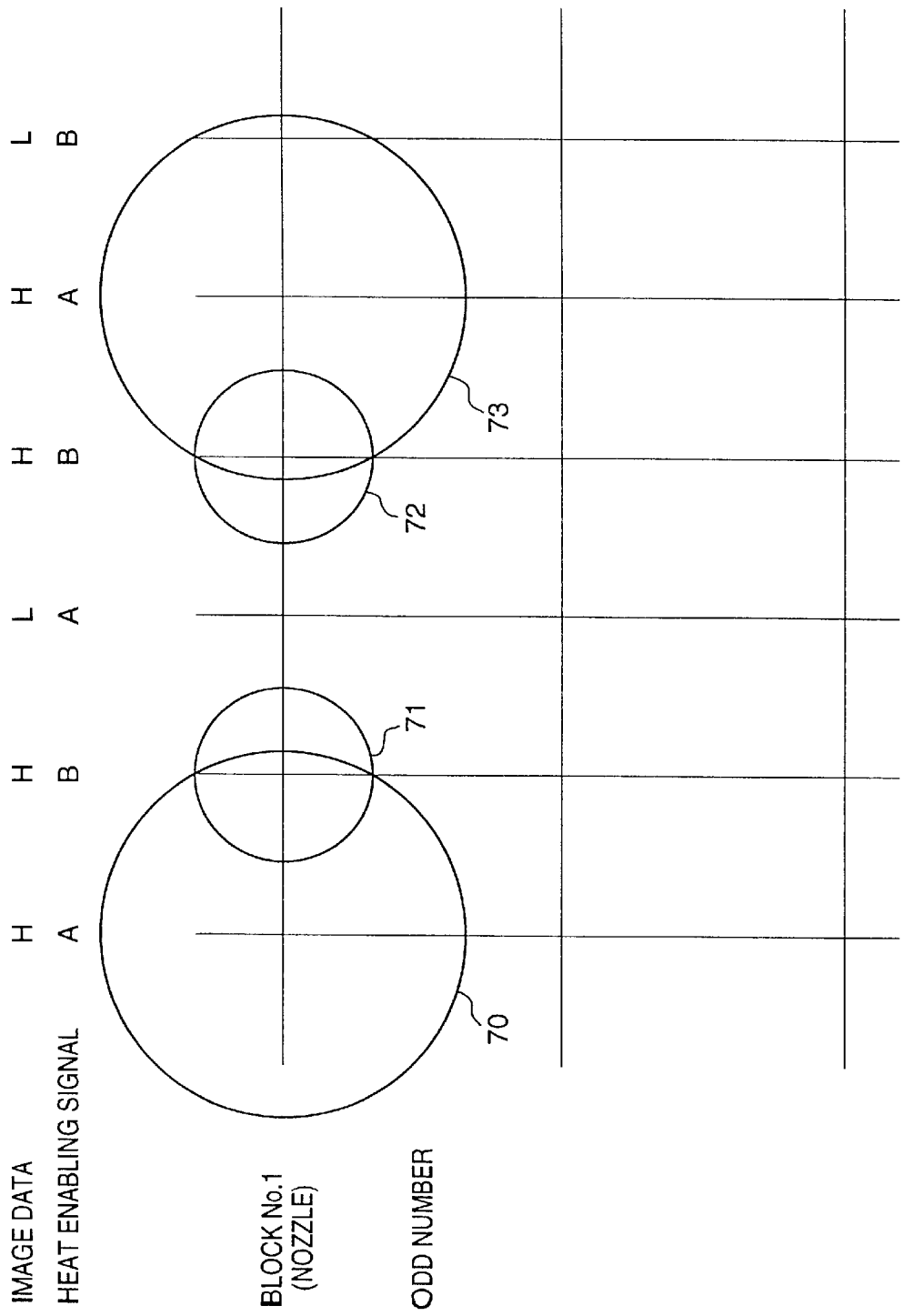
FIG. 7 is an explanatory view for explaining dots printed by the printing apparatus of the present embodiment.
Figure 8:
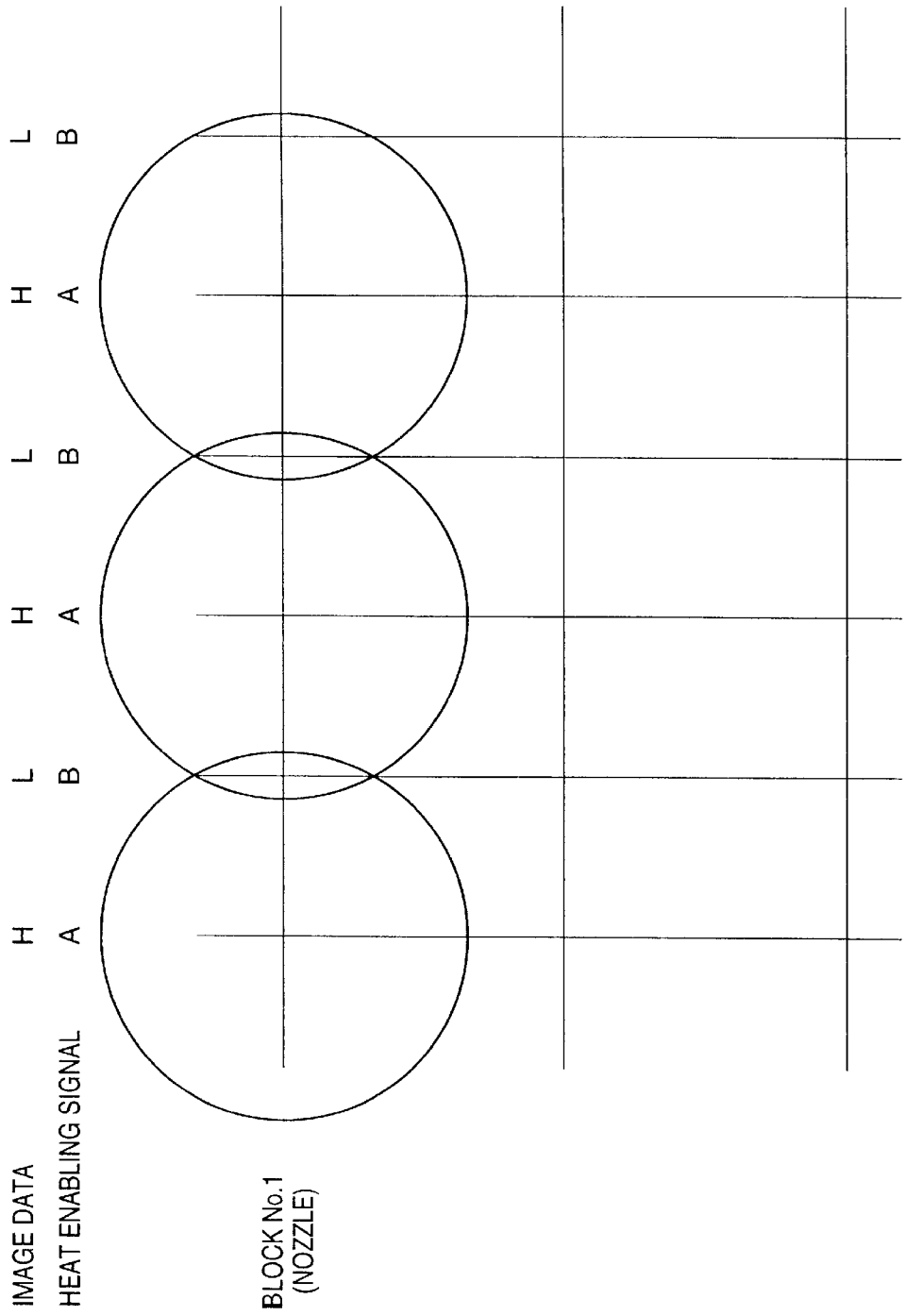
FIGS. 8–11 are explanatory views illustrating an array of dots printed by the printing apparatus of the present embodiment.
Figure 9:
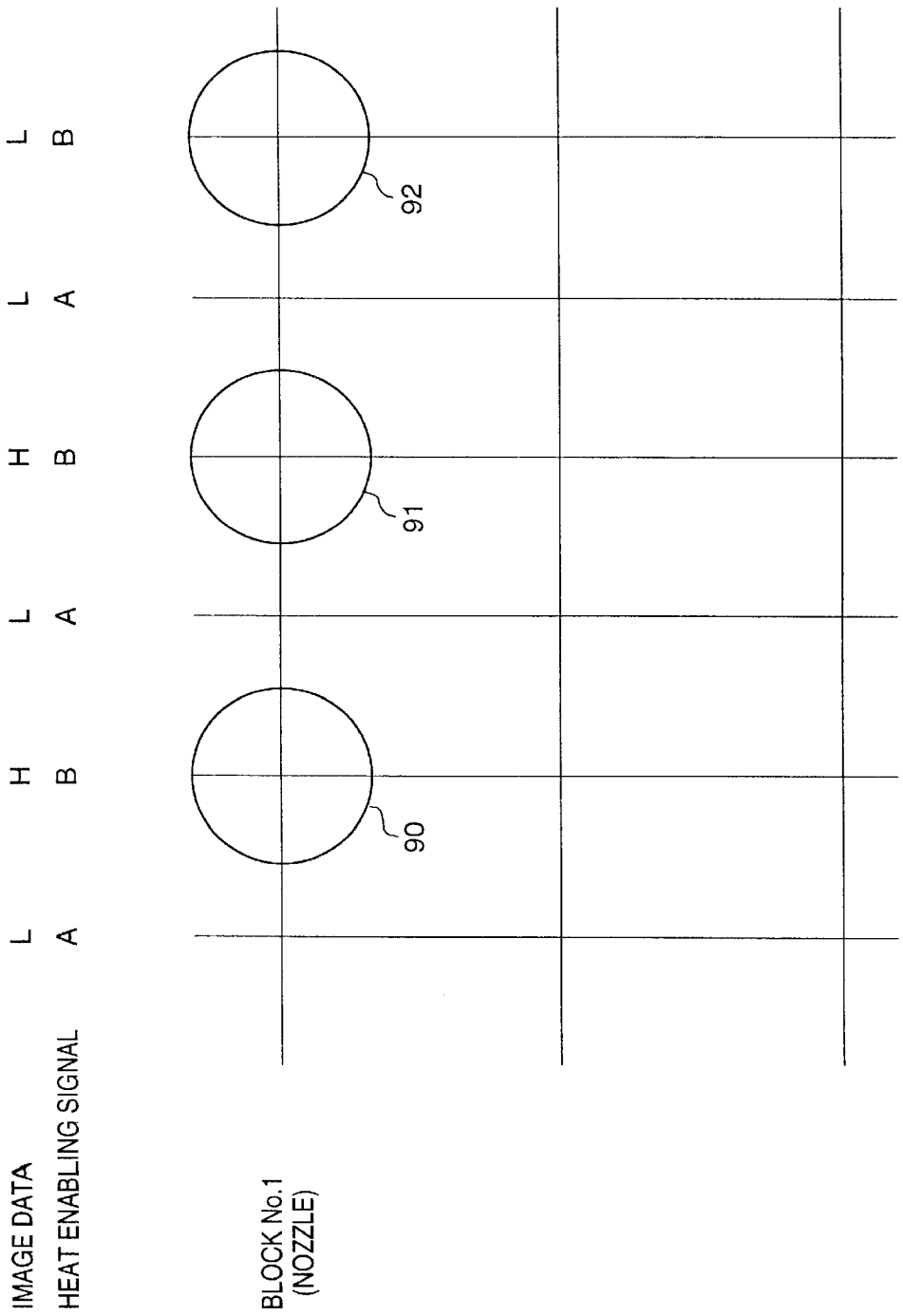

Hereinafter, description will be provided with reference to specific print examples shown in FIGS. 7 to 9. For the purpose of simple explanation, it is assumed herein that a printhead has only one nozzle. In FIGS. 7 to 9, the grid indicates a dot position printed by the printhead.

Referring to FIG. 7, the space of the grid in the main-scanning direction indicates 720 dpi (dot/inch). Herein, this nozzle is assumed to be the first nozzle of Block No. 1. Since the printhead has only one nozzle, the block-selection signal 624 for selecting the Block No. 1 and selection signal 625 for selecting nozzles having odd numbers, are ON (high level) each time. Image data "H" (FIG. 7) indicates a portion where there is data to be printed; and "L", a portion where there is no data to be printed. Signal "A" (FIG. 7) indicative of the heat enabling signal indicates to send a heat signal to the driver A for discharging ink (large dot); and signal "B", to send a heat signal to the driver B (small dot).

As a result, combination of large dots and small dots are printed in the same scanning as shown in FIG. 7. In other words, by outputting the heat enabling signals A and B, large dots 70 and 73 and small dots 71 and 72 are printed as shown in FIG. 7.

If only large dots need to be printed, as shown in FIG. 8, the heat enabling (HEA) signal 627 is outputted when image data corresponding to the subject nozzle is at high level (H).

On the other hand, if only small dots need to be printed, as shown in FIG. 9, the heat enabling (HEB) signal 626 is outputted when image data corresponding to the subject nozzle is at high level (H). Accordingly, small dots as indicated by reference numerals 90 to 92 are printed.

Figure 10:
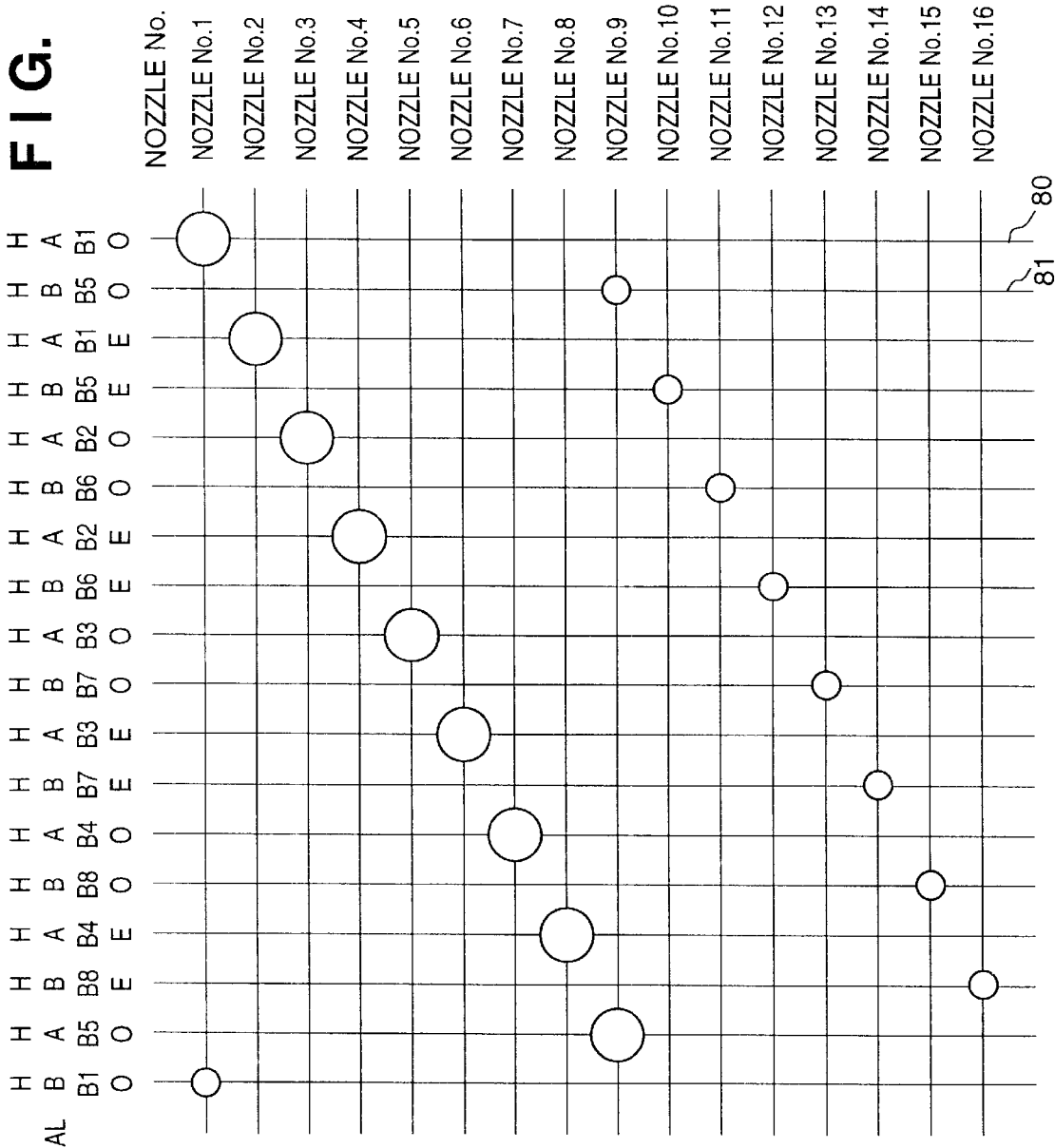

Next, description will be provided in a case where a printhead having a plurality of nozzles is used to perform printing. When a plurality of nozzles are utilized, a plurality of block-selection signals are necessary unlike the above-described case of utilizing one nozzle. Although various driving methods are available in this case, an example will be shown below where a group of adjacent nozzles selected by the odd-number/even-number signal is defined to be one block. In FIG. 10, each block is driven basically in the ascending order of block numbers.

As shown in FIG. 10, eight blocks (B1–B8) are provided for a printhead having sixteen nozzles. Herein, the nozzle indicated as nozzle No. 1 and the adjacent nozzle (nozzle No. 2) are defined as Block No. 1; and as the nozzle number increments, the block number is incremented by one. In FIG. 10, sixteen nozzles are divided into Block 1 (B1) to Block 8 (B8). In this state, a nozzle which satisfies the condition of four signals: the image data at high level (1), the heat enabling signal "ON," the block-selection signal, and the odd/even selection signal, will be driven to discharge ink.

FIG. 10 shows timings in a case where ink is discharged from all nozzles (No. 1–No. 16) in one scanning operation and dots are printed, while scanning the printhead leftwards.

First, at timing 80, when the four signals: the image data signal (H), heat enabling signal (A), block-selection signal (B1) and odd/even selection signal (ODD) are satisfied with respect to the nozzle No. 1, since the heat enabling signal indicates "A," a driving signal is sent to the driver A which is connected to the heater A in the nozzle No. 1, and a large dot is formed by the nozzle No. 1. At the next timing 81, when the four signals: image data signal (H), heat enabling signal (B), block-selection signal (B5) and odd/even selection signal (ODD) are satisfied with respect to the nozzle No. 9 in Block 5 (printhead is tilted as will be described later with reference to FIG. 13), since the heat enabling signal indicates "B," a driving signal is sent to the driver B which is connected to the heater B in the nozzle No. 9, and a small dot is formed by the nozzle No. 9.

The similar processing is performed with respect to nozzle No. 2 in Block 1 and nozzle No. 10 in Block 5, until driving the nozzle 8 in the block 4 and the nozzle No. 16 in the Block 8 to form large dots of one period by the nozzles 1–8 and small dots of one period by the nozzles 9–16, and further small dots of one period by the nozzles 1–8 and large dots of one period by the nozzles 9–16 have been printed (FIG. 10 shows a part of dots). As a result, printing of large dots and small dots of one period by the all nozzles 1–16 have been completed.

Figure 11:
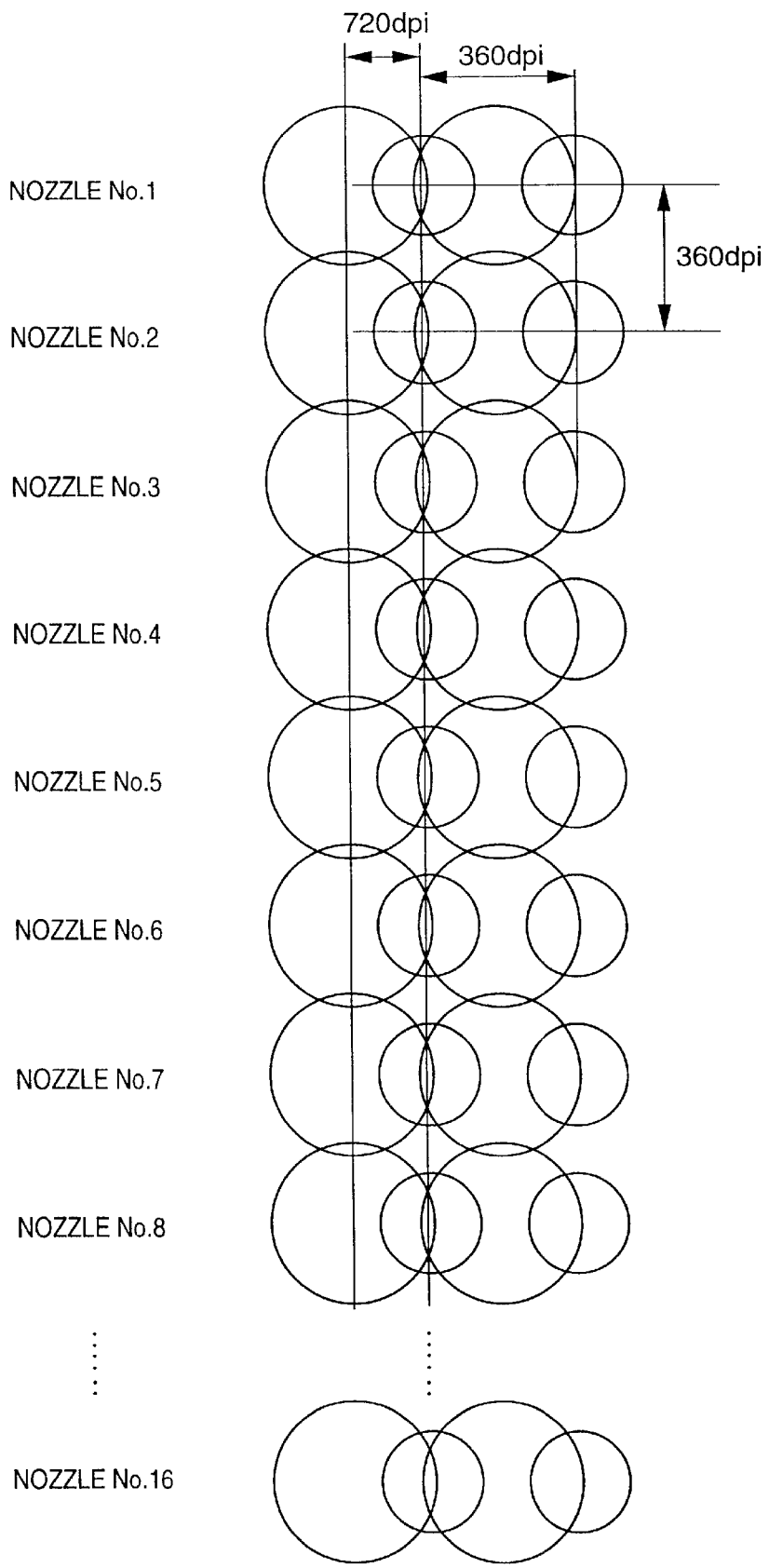

An image printed in the above described manner is shown in FIG. 11. FIG. 11 shows the arrangement of dots printed on a print medium by discharging ink from each nozzle at a timing in conformance to the addresses corresponding to a resolution of 720 dpi×360 dpi. Note that FIG. 11 shows the state where each print data (2 bits) to be printed by all nozzles is "11" (to be described later in detail), and where large dots and small dots corresponding to respective two cycles (four dot columns) of printing are printed, while scanning the printhead leftwards.

Hereinafter description will be provided on an application to an actual printer system utilizing the above-described system for respectively forming large and small dots.

Figure 12:
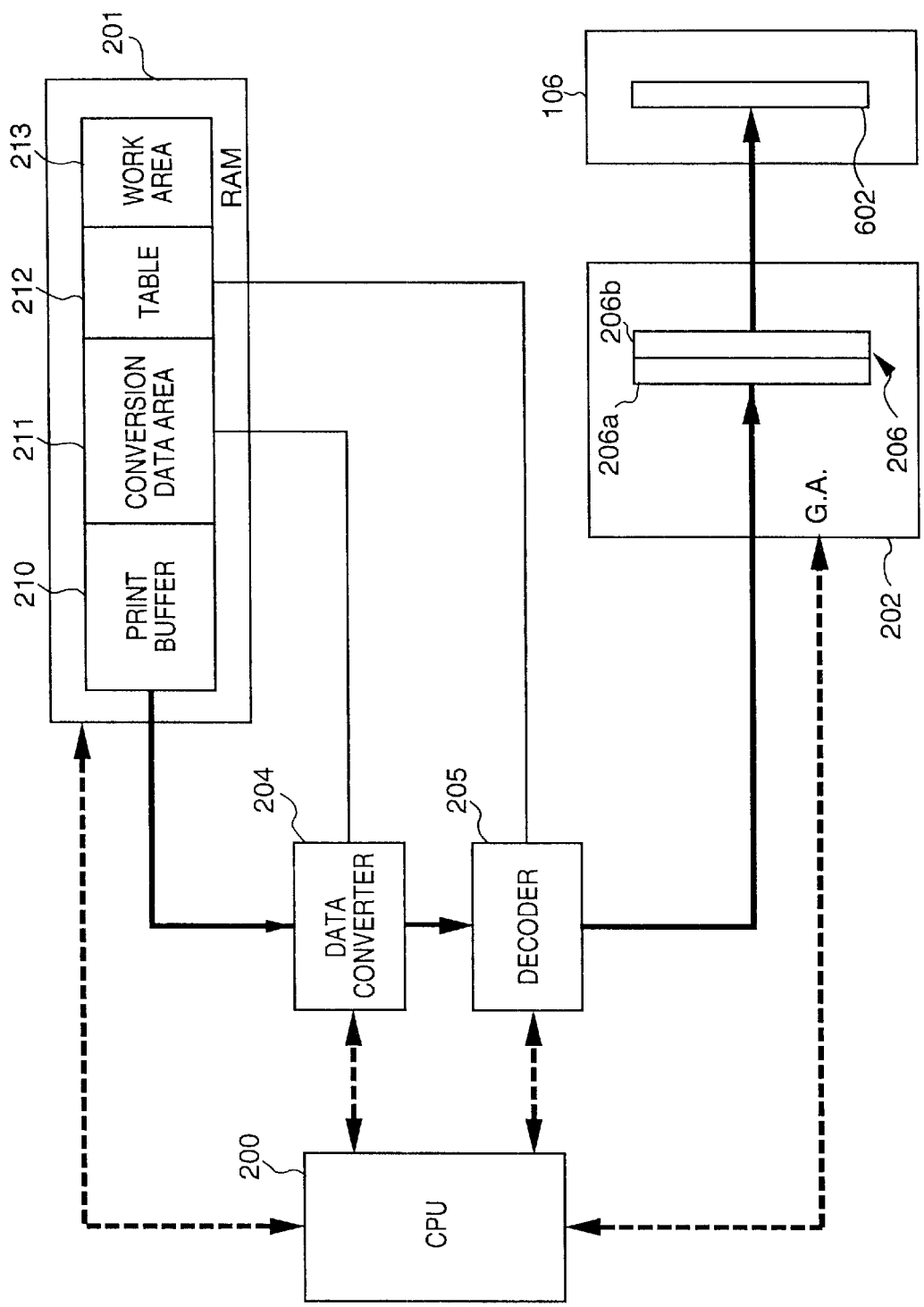
FIG. 12 is a block diagram of a print-data processing circuit in the printing apparatus according to the present embodiment.

FIG. 12 is a block diagram showing the data flow transmitted from a control unit of the printing apparatus to the head cartridge 106. Components identical to those in the foregoing drawings are indicated by the same reference numerals and description thereof will be omitted.

Reference numeral 200 denotes a CPU which controls operation of entire printing apparatus, and FIG. 12 shows only the flow of the signals in the portion related to the present embodiment. Reference numeral 201 denotes a RAM (random access memory), comprising a print buffer 210 which stores print data, a conversion data area 211 which stores conversion data for converting pixel data, a table 212, work area 213 and so on. Print data stored in the print buffer 210 consists of pixels each having two bits. A gate array (G.A) 202 reads out print data stored in the print buffer 210 by direct memory access (DMA). Normally, data is read out of the print buffer 210 in multiples of one word (16 bits). Therefore, for data whose each pixel having two bits, the G.A 202 reads out the data included in the bold-faced frame 1300 from the data arrangement shown in FIG. 13. Reference numeral 204 denotes a data converter which converts pixel data utilizing conversion data. When multiple pass printing is performed, the data converter divides the data to be printed in each pass. Reference numeral 205 denotes a decoder which decodes (modulate) print data having two bits in accordance with modulation data stored in the table 212. Reference numeral 206 denotes a register of the G.A 202, and comprises a register 206a which stores data for forming large dots and a register 206b which stores data for forming small dots.

Figure 13:
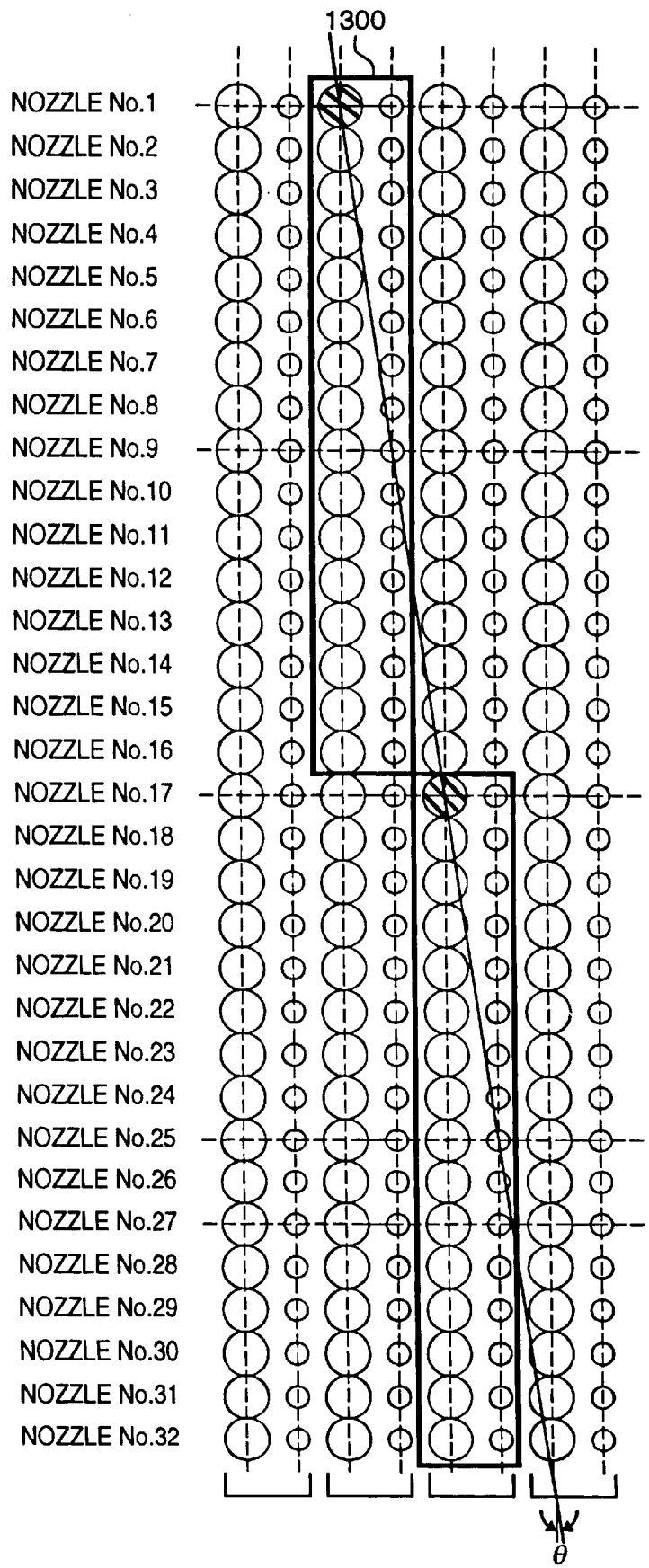
FIG. 13 is an explanatory view showing the dots discharged simultaneously from ink-jet heads and showing the areas for print data.

FIG. 13 shows a part (only 32 nozzles) of a printhead comprising 256 nozzles. The head is constructed such that it is tilted by a predetermined angle θ with respect to the scanning direction (horizontal direction in FIG. 13) of the head.

Referring to FIG. 13, ink is discharged by simultaneously driving two nozzles, e.g., in the first cycle, nozzle No. 1 and nozzle No. 17 for large dots, then nozzle No. 9 and nozzle No. 25 for small dots, then nozzle No. 2 and nozzle No. 18 for large dots, nozzle No. 10 and nozzle No. 26 for small dots and so on. In the second cycle, ink is discharged simultaneously from two nozzles respectively: nozzles No. 1 and No. 17 for small dots, then nozzles No. 9 and No. 25 for large dots, nozzles No. 2 and No. 18 for small dots and so on, thereby printing an image corresponding to 32 pixels. In the third cycle, as similar to the first cycle, two nozzles are simultaneously driven, e.g., nozzles No. 1 and No. 17 for large dots, nozzles No. 9 and No. 25 for small dots, nozzles No. 2 and No. 18 for large dots and so on. Note that FIG. 13 shows the case where print data having two bits is all "11" (to be described later in detail).

In the present embodiment, in order to express tone of an image by a combination of two dots on the basis of the print data having two bits, the data converter 204 and decoder 205 convert the data at the time of reading print data out of the print buffer 210, and store the converted data in the register 206 of the G.A 202. Several methods may be considered for a case of single pass printing and a case of multiple pass printing. Hereinafter, an embodiment of the single pass printing will be explained.

Figure 14:
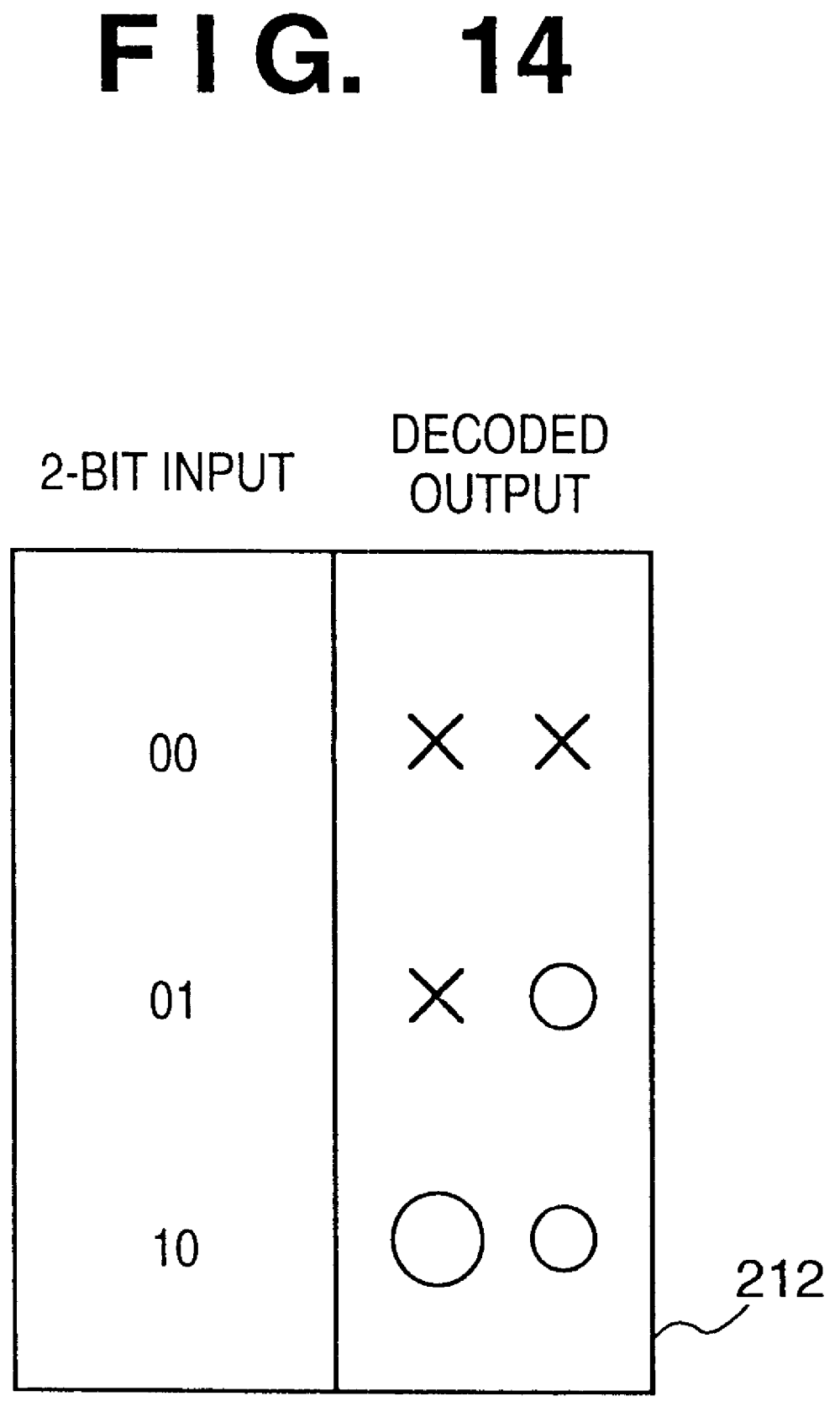

FIG. 14 is an explanatory view showing that print data, in which each pixel read out of the print buffer 210 is expressed in two bits, is decoded by the decoder 205.

The printing apparatus according to the present embodiment receives data expressed in the quaternary system (each pixel is expressed in two bits) which has been outputted by the printer driver 103 of the host computer, and writes the received data into the print buffer 210. The data each having two bits, written in the print buffer 210, is decoded by the two-bit decoder 205 in accordance with contents stored in the table 212, according to the relationship shown in FIG. 14, and is transferred by DMA to the register 206 of the G.A 202. At this stage, in the case of single pass printing, the print data is transferred without being processed by the data converter 204. FIG. 14 shows the case where a large dot and a small dot are allocated to two-bit data "10," and a small dot only is allocated to print data "01." Changing the contents of the table 212 would enable. an arbitrary decoded output by the decoder 205 with respect to two-bit data.

Next, an embodiment of the multiple pass printing will be described. When multiple pass printing is performed, as shown in FIG. 15, a print medium is conveyed at each scanning of the printhead in the sub-scanning direction for a length corresponding to 1/n (in FIG. 15, n=3) of the length of a nozzle array to be used, thereby printing interpolated data in each scanning operation to complete an image.

Figure 15:
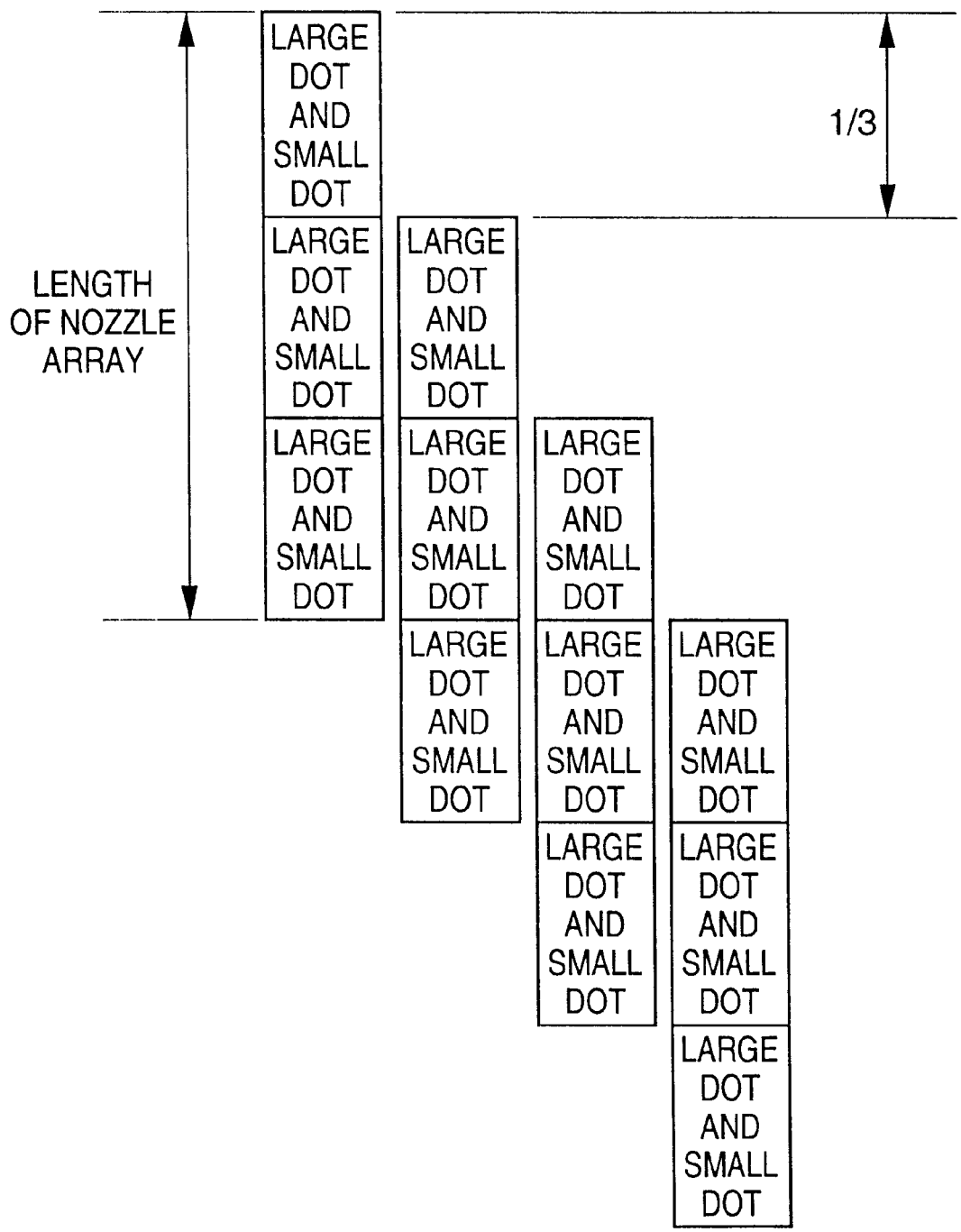
FIG. 15 is an explanatory view for explaining a method of multiple pass printing.

In FIG. 15, the print medium is conveyed at each scanning operation for a length corresponding to the ⅓ of the length of the nozzle array, whereby printing one band in three pass. In the conventional printing method, a thinned out image (based on one-bit data) is first printed in the main-scanning direction, and then the print medium is advanced in the sub-scanning direction, further performing printing operation (based on one-bit data) in the main-scanning direction with respect to the portion thinned out in the previous main-direction scanning, to complete the image. On the other hand, according to the present embodiment, two-bit data is outputted at each scan in the main-scanning direction as similar to the above-described case. In addition to this, decoding function is added to the conventional thin out function (herein, data conversion) to improve the capability of tone expression. This function will be described with reference to FIGS. 16A and 16B.

Figure 17:
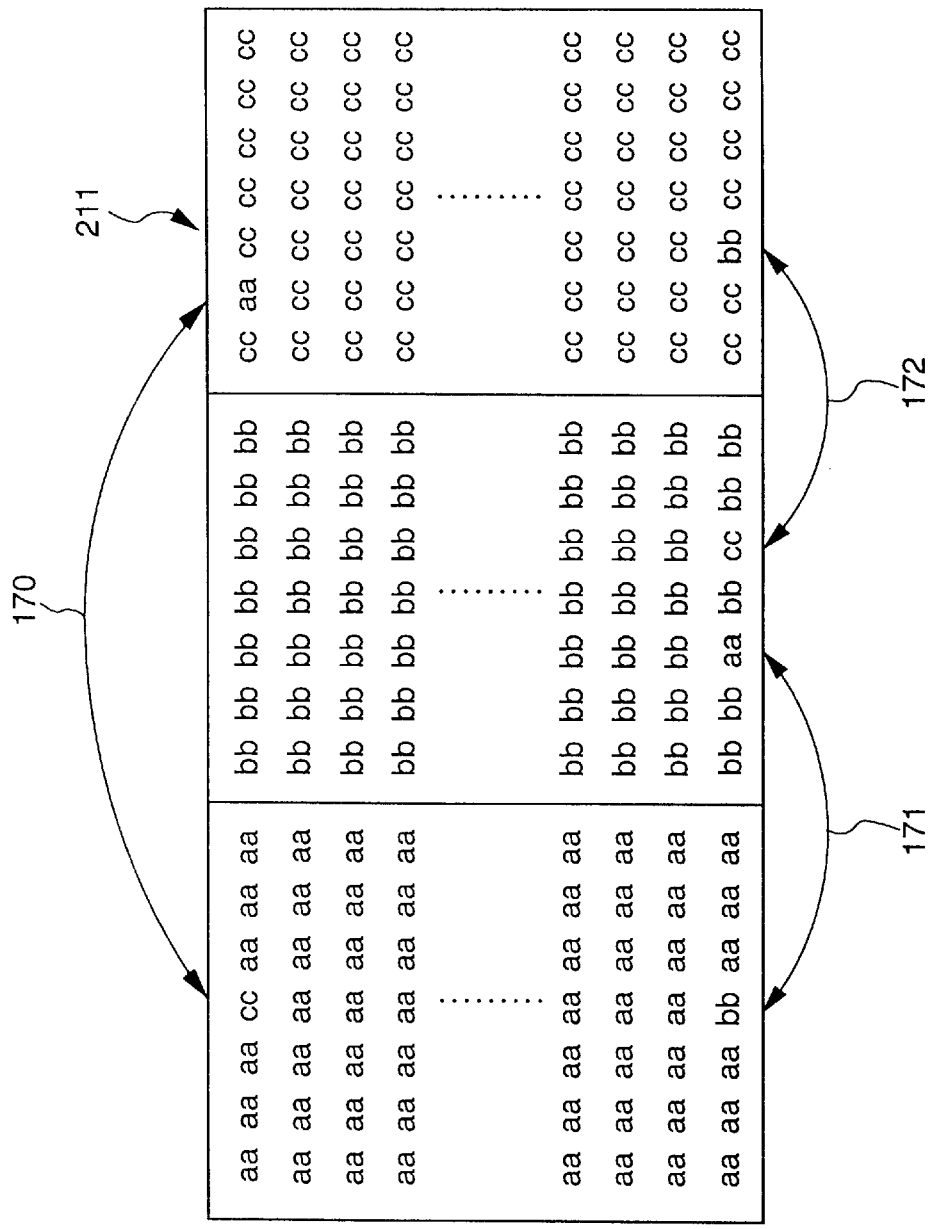
FIG. 17 is an explanatory view for explaining a method of generating random mask data.

In the present embodiment, print data expresses tone in two bits. Thus, data used for thin out (data conversion) is a combination of two bits of data, and is stored in the conversion data area 211 in the RAM 201. To generate such data, assuming the case of three-pass printing, three groups of two-bit data ("aa" for the first pass, "bb" for the second pass and "cc" for the third pass) are allocated to the memory area 211 as shown in FIG. 17 such that each area has the equal number of data.

Figure 16B:
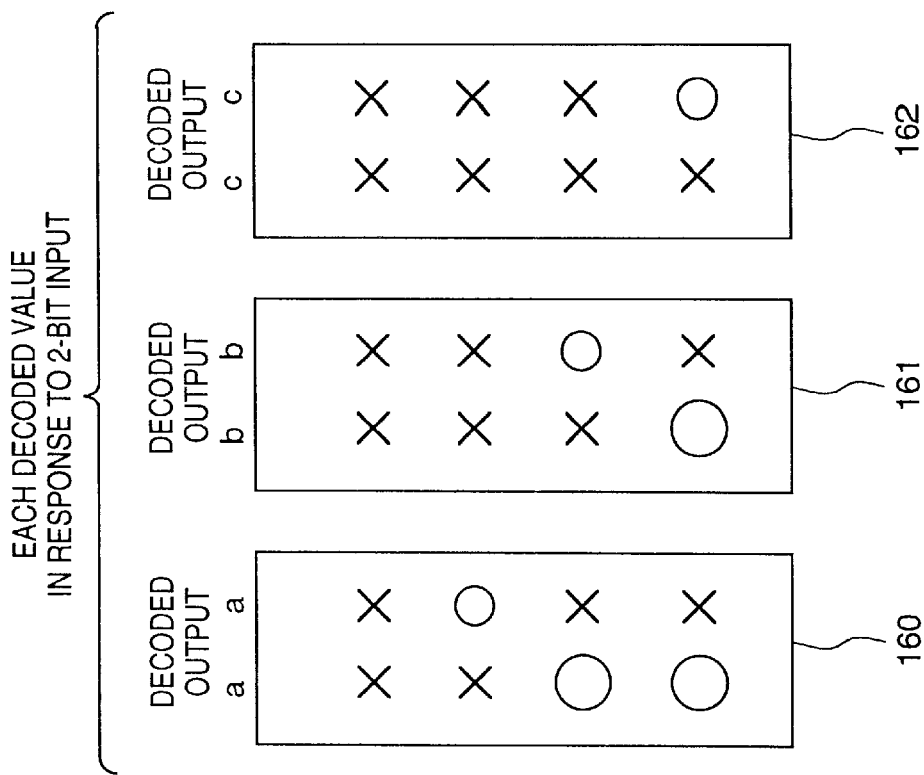
FIGS. 16A and 16B are an explanatory view showing data in the two-bit decode table and printed dots.
Figure 16A:
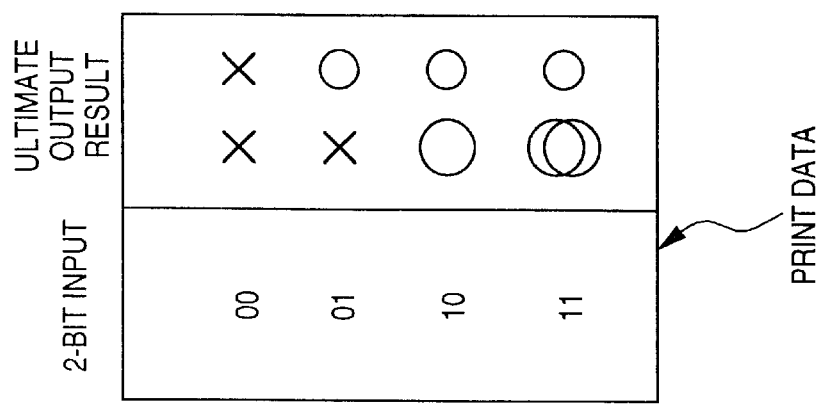

The three groups of two-bit data are then shuffled. By repeating the above process for more than a predetermined number of times, a random-number table having three groups of data randomly shifted is obtained as indicated by reference numerals 170, 171 and 172 in FIG. 17. The data generated in the above manner is stored in the conversion data area 211 shown in FIG. 12. In the case of three-pass printing, the data converter 204 converts print data for each scanning operation in accordance with the above conversion data. FIGS. 16A and 16B show an example thereof.

Referring to FIGS. 16A and 16B, FIG. 16A shows ultimate outputs of the two-bit data and FIG. 16B shows each of the decoded results for each scan in response to two-bit inputs.

In FIG. 16B, the data indicated by reference numeral 160 (for the first pass) is an example where print data (two bits) is converted by data "aa" and further converted by the decoder 205 in accordance with the contents of the table 212; 161 (for the second pass), an example where print data is converted by data "bb" and further converted by the decoder 205 in accordance with the contents of the table 212; and 162 (for the third pass), an example where print data is converted by data "cc" and further converted by the decoder 205 in accordance with the contents of the table 212. FIG. 16A shows a printed example of each pixel of the print data printed in three scanning (three pass).

In the example shown in FIGS. 16A and 16B, print data "00" indicates to print nothing (XX denotes no dot); print data "01" indicates the lowest density where one small dot is printed within three-pass printing; print data "10" indicates that one large dot and one small dot are printed respectively; and print data "11" indicates that two large dots are overlappingly printed and one small dot is further printed. Note that FIGS. 16A and 16B are merely an example and the present invention is not limited to this.

By changing the contents of the table 212 stored in the RAM 201, it is possible to select any combination from a plurality of combinations, for instance, from the four patterns of combinations of the output results shown in FIG. 16A.

As density of an image becomes higher (darker), a large dot is printed in addition to a small dot, printing a pair of a small dot and a large dot in separate positions as explained in FIG. 16A. Making use of the above, for instance as shown in FIG. 18, a gap between the printed small dots is filled in by printing a large dot, enabling to obtain a print without any spaces between adjacent small dots.

FIG. 19 shows a printed example where large dots are printed in a position indicated by reference numeral 190 and no small dot is printed in the adjacent position 191. In this case, a space is generated in the right side of the large dots.

As exemplified in FIG. 19, the above-described problem arises when two-bit input data changes from "01" (one small dot) to "10" (only one large dot). To cope with the problem, according to the present embodiment, when tone is to be expressed with sub pixels (a large dot and a small dot), a combination of a large dot and a small dot is printed for the data "10" as shown in FIG. 16A, thereby preventing from forming a gap in the printed image due to lack of one small dot.

Figure 20:
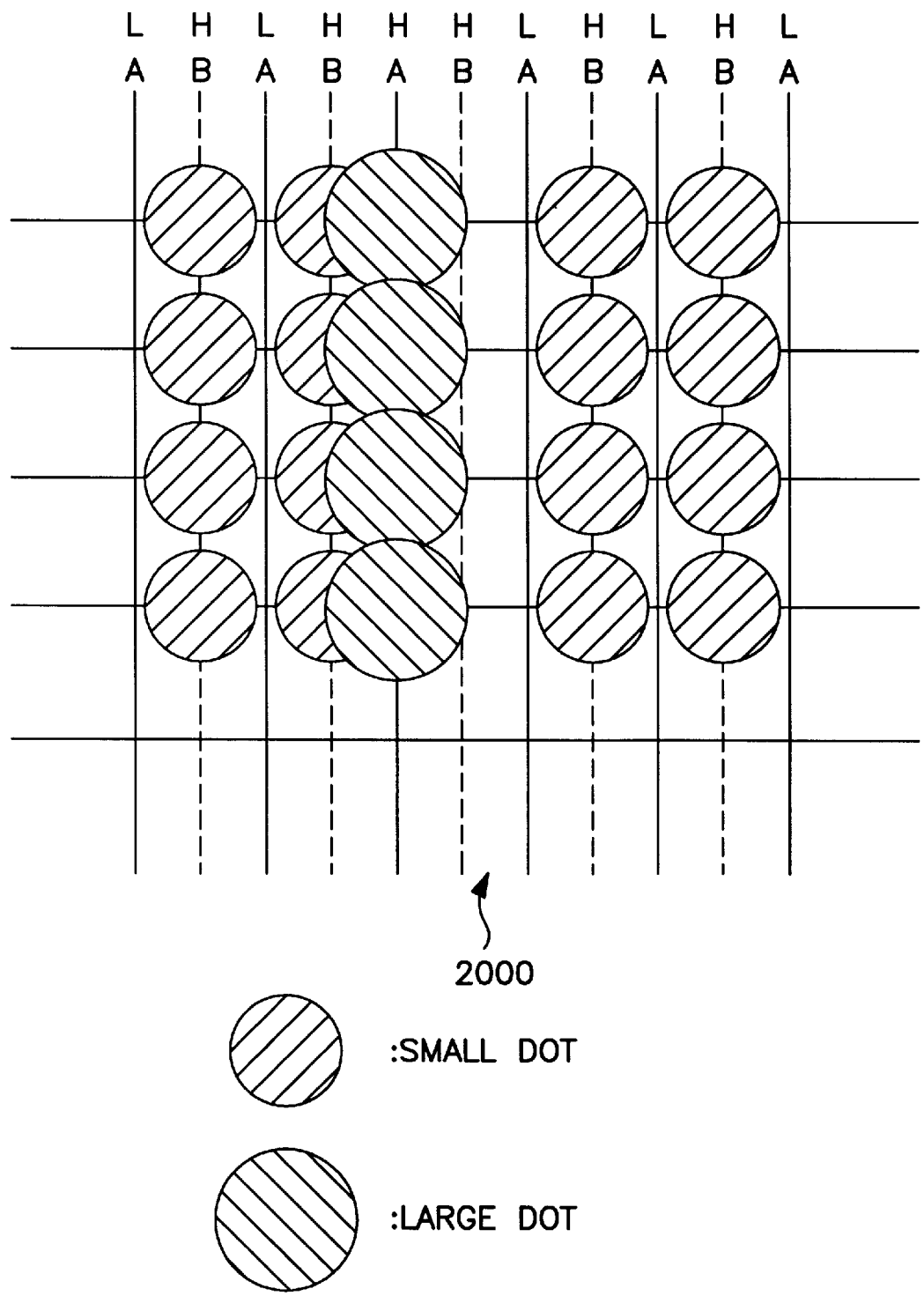

FIG. 20 also shows a disadvantage occurred when only one large dot is printed for two-bit data "10." Herein, a large dot is printed for the print data "10" in-between the small dots corresponding to the print data "01," and a gap 2000 is generated in a section where image density changes. To deal with this disadvantage, FIG. 21 shows the case where the above disadvantage is solved by printing a large dot and a small dot for the print data "10."

Figure 22:
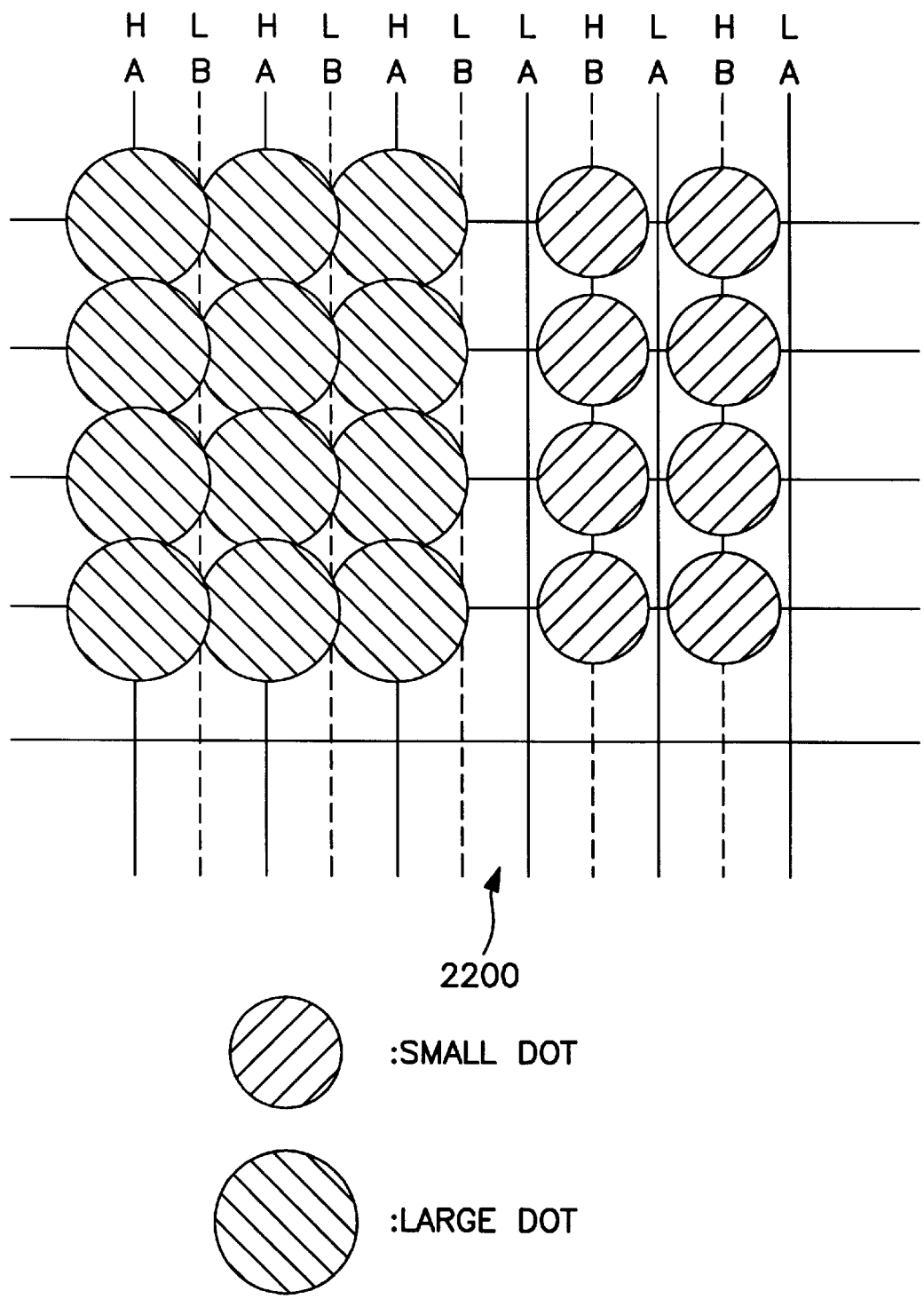
FIG. 22 is an explanatory view for explaining inconvenience of the conventional printing method.

Similarly, FIG. 22 shows a printed example of a boundary between a dark portion printed in high density (data "10") and a light portion printed in low density (data "01"). Because of the same process as that of the FIG. 20, a gap 2200 is generated in the image portion where density changes ("10"→"01"). FIG. 23 shows a printed example where such disadvantage in FIG. 22 is removed in the similar manner to that of FIG. 21.

By virtue of the printing in such bit arrangement, two-bit data is equally distributed to each scanning in the random manner. Accordingly, difference in the number of dots printed in each scanning can be substantially obviated.

Furthermore, the present embodiment utilizes the table 212 having two-bit codes to also shuffle allocation of large and small dots, along with the groups of two-bit data. Therefore, even if the number of large dots or small dots are largely unbalanced, it is possible to uniformly allocate each size of the dots to each scanning by changing the codes of the table 212. Conventionally, when the above method is adopted, maximum of two dots are printed and three levels of tone are expressed based on two-bit data. However, by virtue of effective application of the above-described features, i.e., the head cartridge 106 capable of printing large dots and small dots, multiple pass printing, decoding in two-bit codes, random conversion data and so on, it is possible to perform printing, utilizing the combination of three large dots and three small dots at the maximum. Four combination patterns can be selected from the selectable sixteen patterns of tone. In addition, the number of pass of multiple pass printing may be increased, or two-bit codes are increased to three-bit codes or four-bit codes to largely increase the capability of tone expression, thereby increasing the dynamic range. Moreover, the modulation is not necessarily the two levels of large and small, but plural levels of tone modulation is possible.

Figure 24:
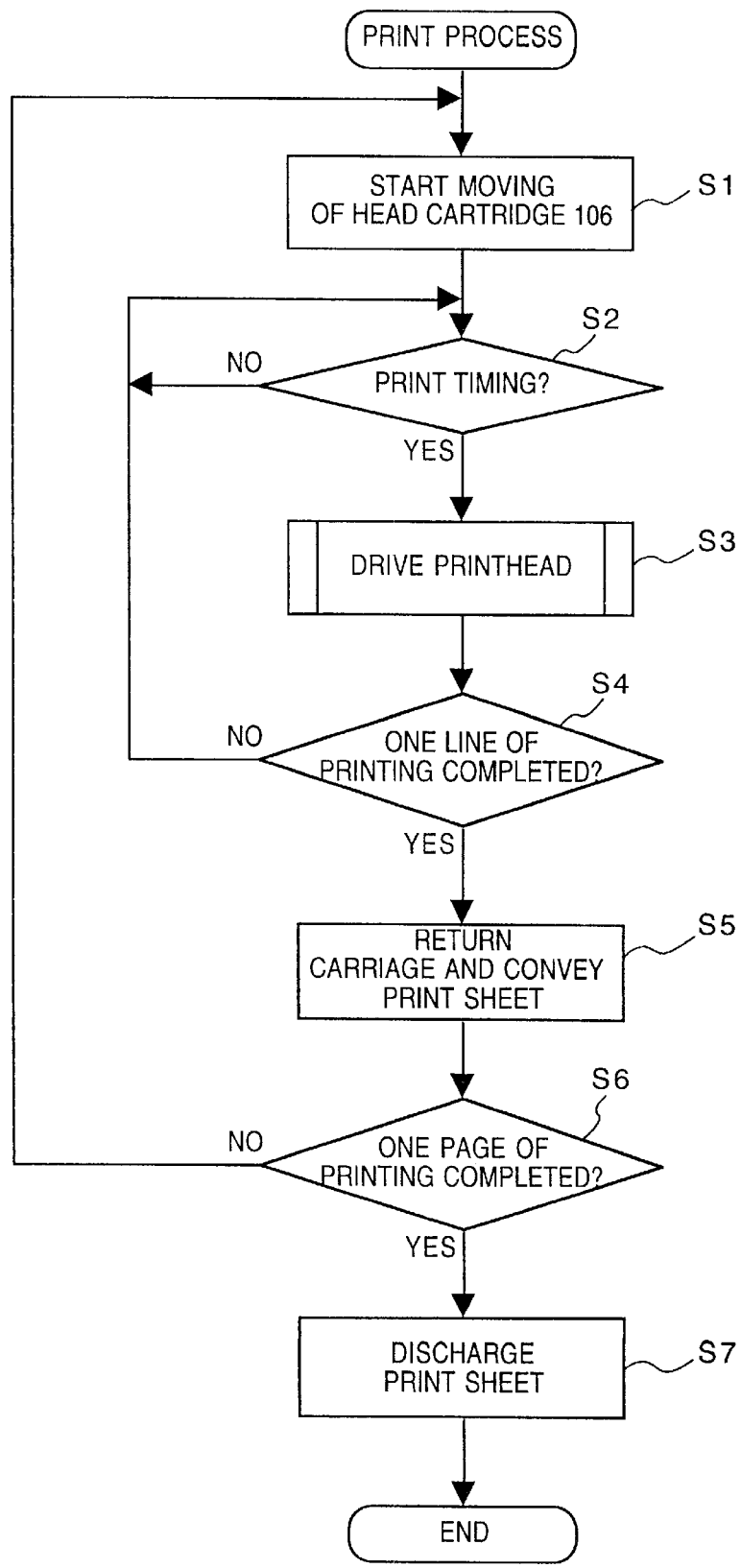
FIG. 24 is a flowchart explaining print processing performed by the ink-jet printing apparatus of the present embodiment.

FIG. 24 is a flowchart showing print processing performed by the ink-jet printing apparatus of the present embodiment. This process is executed while controlled by the CPU 200. The process starts when data is received from the host computer and print data corresponding to at least one scanning or one page is stored in the print buffer 210.

In step S1, the carriage motor 6 is driven to move the head cartridge 106; and in step S2, it is determined whether or not the printhead is at the print timing. When it is at print timing, processing proceeds to step S3 where the printhead is driven to perform printing corresponding to one array of nozzles of the printhead (shown in flowchart in FIG. 25). In step S4, it is determined whether or not one line of print processing is completed. If one line of print processing is not completed, the processing returns to step S2; otherwise, the processing proceeds to step S5 where the carriage is returned, and a print sheet is advanced for a length corresponding to the printed width, then the processing proceeds to step S6. In step S6, it is determined whether or not printing corresponding to one page is completed. If it is not completed, the processing returns to step S1, otherwise the processing proceeds to step S7 where the printed sheet of paper is discharged.

Figure 25:
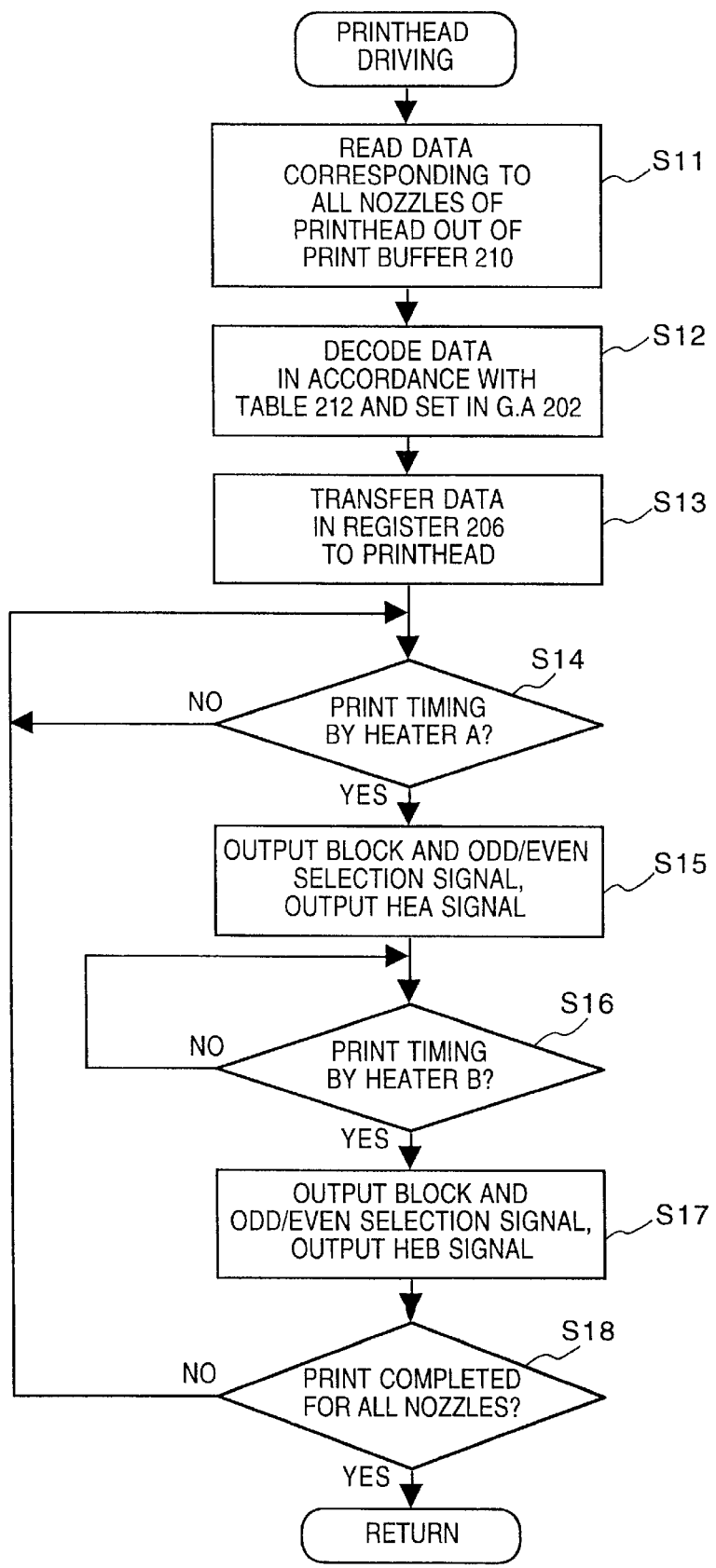
FIG. 25 is a flowchart explaining head-drive processing executed in step S3 in FIG. 24.

Next, the printhead driving process in the ink-jet printer of the present embodiment will be described with reference to the flowchart in FIG. 25.

In step S11, print data corresponding to one array of nozzles is read out of the print buffer 210, and the data is subjected to go through the data converter 204, decoded by the decoder 205, and set in the registers 206a and 206b of the G.A 202 (step S12 performed by DMA). In step S13, the data set in the registers 206a and 206b is transferred to the shift register 602 of the head cartridge 106. Since each nozzle forms one dot having one level of tone (consisting of two dots (upper and lower bit) at most) by respectively driving the heaters A and B, it is determined first in step S14 whether or not the heater A is at the driving timing. If it is at the driving timing, the processing proceeds to step S15 where the block selection-signal 624 and odd/even selection signal 625 are outputted to specify nozzles to be driven simultaneously. Then, the HEA signal 627 for driving the heater A is outputted. As a result, if data (upper bit) corresponding to the selected nozzle is "1 (H)", the nozzles form large dots.

Next, the processing proceeds to step S16 to determine whether or not the heater B is at driving timing. If the heater B is at driving timing, the processing proceeds to step S17 where the block-selection signal 624 and odd/even selection signal 625 are outputted to specify nozzles to be driven by the heater B, and the HEB signal 626 is outputted. As a result, if data (lower bit) corresponding to the selected nozzle is "1 (H)", the nozzles form small dots.

Then the processing proceeds to step S18 where it is determined whether or not printing is completed for all nozzles of the printhead. If the printing for all nozzles is completed, the processing returns to the beginning; otherwise, the processing proceeds to step S14 to determine timing of the heater A and timing of the heater B and perform printing by sequentially driving the remaining nozzles.

Figure 26:
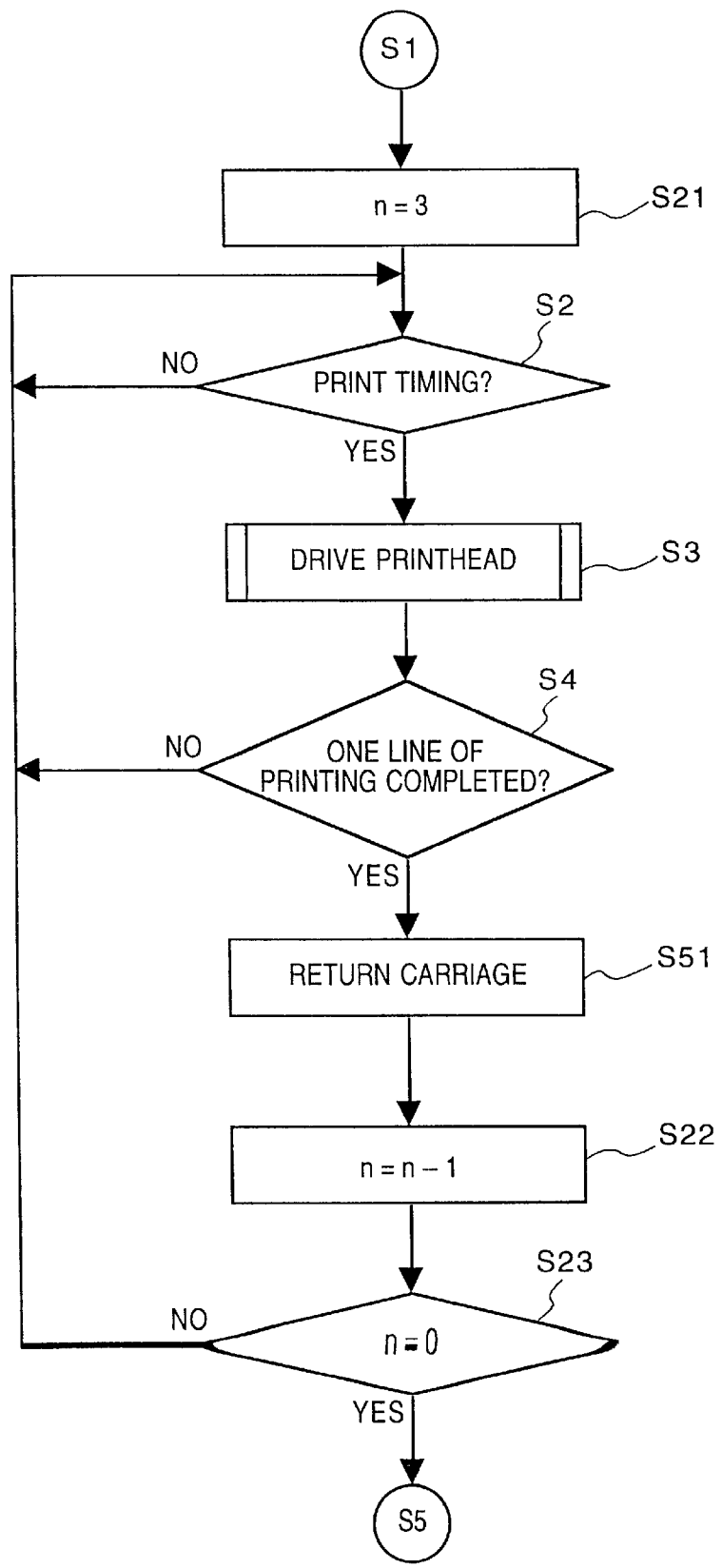
FIG. 26 is a flowchart explaining print processing in three pass according to the present embodiment.

FIG. 26 is a flowchart showing the process of three-pass printing according to the present embodiment. Processes that are identical to those in the above-described flowchart are indicated by the same step numerals and description thereof will be omitted.

In step S21, "3" is set at a counter n which counts the number of the pass. The printhead driving operation in steps S2–S5 is repeated until n=0 is satisfied in step S23. Herein, the data printed in correspondence with each scanning is generated by the data converter 204 and decoder 205.

The present invention is particularly advantageous when applied to a printhead and a printing apparatus adopting the ink-jet printing method, particularly the type utilizing thermal energy.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of the largest printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip-type printhead which enables electrical connection to the main unit or supplying of ink by being incorporated to the main unit of the printing apparatus, may also be utilized.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in the above-mentioned embodiment of the present invention, it is assumed that the ink is a liquid. Alternatively, the present invention may employ an ink which is solid at room temperature or less, or an ink which softens or liquefies at room temperature, or an ink which liquefies upon application of a printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite to electrothermal transducers while being held in a liquid or solid state in recess portions of a porous sheet or through holes, as described in Japanese Patent Laid-Open No. 54-56847 or No. 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (Operating System) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion board or unit performs a part or entire process in accordance with designations of the program codes and realizes functions of the above embodiment.

As set forth above, the above-described embodiment having simple construction can print plural sizes of dots on a print medium, even in the case of single-scan (pass) printing.

Furthermore, the present invention has an effect which has not conventionally been recognized, that is, in multiple pass printing, even in a case the number of dots and small dots printed in one pass is unbalanced (printing ratio of large dots to small dots is uneven), the printing ratio can be substantially equalized for each pass.

Moreover, to balance the dots to be printed in each pass, mask data for multiple pass printing is additionally used, thereby enabling to select dots and allocate data to each pass simultaneously. Accordingly, it is possible to simplify control operation.

On account of the function which equally balances the printing ratio for each pass, print unevenness due to deviated dots or dots having non-uniform diameters, can be prevented even in a case where the number of large dots and the number of small dots in image data is largely unbalanced. Accordingly, it is possible to effectively operate the print function in multiple pass printing.

Moreover, with respect to each of the nozzles, the average printing ratio for each pass is balanced. Thus it is possible to decrease error rate such as discharge failure or the like caused by printing in high printing ratio. In addition, since the discharge amount is continuously changed for each nozzle, it is possible to reduce the average amount of ink discharge for each nozzle even if the printing ratio is high. As a result, it is possible to improve refill frequency, and reduce error rate. Furthermore, it is also possible to reduce instantaneous power consumption, thereby enabling large cost reduction for power and making it possible to prevent decline in throughput due to the use of a power monitor and the like.

The present invention is not limited to the above embodiments and various changes and modifications can be made within the spirit and scope of the present invention. Therefore, to appraise the public of the scope of the present invention, the following claims are made.

What is claimed is:

1. An ink-jet printing apparatus for printing an image on a print medium by discharging ink from each of a plurality of printing elements of a printhead, comprising:

ink-discharge means, provided with each of the plurality of printing elements, for discharging of an alternative amount of ink from each of the printing elements of the printhead;

modulate means for modulating image data to generate print data for each pixel in order to print dots by using said ink-discharge means, including at least one small dot and/or large dot, corresponding to density of the image data;

timing control means for determining a plurality of ink discharge timings in a printing cycle for each pixel, where at each ink discharge timing, the amount of ink which has been altered by said ink-discharge means is discharged; and control means for outputting print data generated by said modulate means to the printhead in synchronization with each corresponding ink discharge timing determined by said timing control means, wherein said modulate means generates the print data such that the print head discharges the alternative amount of ink in the plurality of ink discharge timings based on the print data in an area in which the density of the image data changes.

2. The ink-jet printing apparatus according to claim 1, wherein said timing control means determines ink discharge timing for at least printing a large dot by the printing elements, and ink discharge timing for printing a small dot by the printing elements.

3. The ink-jet printing apparatus according to claim 1, wherein said ink-discharge means comprises either a plurality of heat resistance units each of which having different heating capacities, or a plurality of heat resistance units each of which being provided on different locations for a single printing element, and said ink-discharge means changes the alternative amount of ink by changing the number and/or the location of heat resistance units to be driven in substantially simultaneous timing.

4. The ink-jet printing apparatus according to claim 1, wherein said control means controls at least a small dot or combination of a large dot and a small dot to express tone of the print data modulated by said modulate means.

5. The ink-jet printing apparatus according to claim 1, further comprising:

scan-data generating means for generating print data corresponding to each scanning by dividing the print data into data which corresponds to each scanning and modulating the divided data in accordance with modulation data; and multiple pass control means for performing printing by a plurality of times of scanning on the basis of the print data generated by said scan-data generating means.

6. The ink-jet printing apparatus according to claim 5, wherein the modulation data is random-number data provided in correspondence with each scanning.

7. The ink-jet printing apparatus according to claim 1, wherein the printhead discharges ink utilizing thermal energy, and includes a thermal energy generator for generating thermal energy to be provided to ink.

8. An ink-jet printing apparatus for performing printing by relatively moving a print medium and a printhead, comprising:

ink-discharge means for discharging an alternative amount of ink from the printhead;

modulate means for modulating multi-value image data to generate print data for each pixel, on which at least one small dot and a large dot is printed to express a pixel of the multi-value image data by using said ink-discharging means;

timing control means for determining a plurality of ink discharge timings in a printing cycle for each pixel, where at each ink discharge timing, the amount of ink which has been altered by said ink-discharge means is discharged based on the print data; and control means for outputting the print data modulated by said modulate means to the printhead in synchronization with each corresponding ink discharge timing determined by said timing control means, wherein each pixel of a multi-value image printed in accordance with the control of said control means is formed by at least one small dot or combination of a large dot and a small dot.

9. The ink-jet performing apparatus according to claim 8, wherein said control means controls to print by scanning the printhead for a plurality of times, and said modulate means generates print data by modulating the multi-value image data in correspondence with each scanning of the printhead.

10. An ink-jet printing method of printing an image on a print medium by discharging ink from each of a plurality of printing elements of a printhead, comprising the steps of:

modulating image data to generate print data in order to print dots for representing each pixel of the image data, including at least one small dot and/or large dot, corresponding to density of the image data;

determining a plurality of ink discharge timings in a printing cycle for each pixel, where at each ink discharge timing, the amount of ink to be discharged is determined by the print data to print a large dot or a small dot; and printing an image on the print medium by outputting the print data modulated in said modulating step in synchronization with each corresponding ink discharge timing, wherein the printhead discharges ink in the plurality of ink discharge timings based on the print data in an area in which the density of the image data changes.

11. The ink-jet printing method according to claim 10, wherein the ink discharge timing includes ink discharge timing for at least printing a large dot by the printing elements, and ink discharge timing for printing a small dot by the printing elements.

12. The ink-jet printing method according to claim 10, wherein the amount of ink discharged by the printhead is altered by a plurality of heat resistance units each of which having different heating capacities, or a plurality of heat resistance units each of which being provided on different locations for a single printing element, wherein the number and/or the location of the heat resistance units to be driven in substantially simultaneous timing is changed to alter the amount of ink discharge.

13. The ink-jet printing method according to claim 10, wherein printing is performed such that tone of the print data modulated in said modulating step is expressed by at least a small dot or combination of a large dot and a small dot.

14. The ink-jet printing method according to claim 10, further comprising:

a scan-data generating step of generating print data corresponding to each scanning by dividing the print data into data which corresponds to each scanning and modulating the divided data in accordance with modulation data; and a multiple pass control step of performing printing by the printhead scanning for a plurality of times on the basis of the print data generated in said scan-data generating step.

15. An ink-jet printing method for performing printing by relatively moving a print medium and a printhead, comprising the steps of:

modulating multi-value image data to generate print data for driving heating elements, each of which is provided with each printing element of the printhead and alters an amount of ink discharged from the printhead, on which at least one of a small dot and a large dot is printed to express a pixel of the multi-value image data;

determining a plurality of ink discharge timings in a printing cycle for each pixel, where at each ink discharge timing, the amount of ink has been altered by using the heating elements; and outputting the print data generated in said modulating step to the printhead in synchronization with each corresponding ink discharge timing determined in said determining step, wherein in said outputting step, each pixel of a multi-value image printed is formed by at least one small dot or combination of a large dot and a small dot.

16. The ink-jet printing method according to claim 15, wherein in said printing step, printing is performed by scanning the printhead for a plurality of times, and in said modulating step, print data is generated by modulating the multi-value image data in correspondence with each scanning of the printhead.

* * * * *

UNITED STATES PATENT AND TRADEMARK OFFICE
CERTIFICATE OF CORRECTION

PATENT NO. : 6,305,775 B1
DATED : October 23, 2001
INVENTOR(S) : Naoji Ohtsuka et al.

It is certified that error appears in the above-identified patent and that said Letters Patent is hereby corrected as shown below:

Title page,
Item [56] References Cited, U.S. PATENT DOCUMENTS, please insert
-- 5,381,170    1/1995    Mutoh    347/15 --.

Column 3,
Line 10, "operation," should read -- operations, --;
Line 25, "pass" should read -- passes --; and
Line 47, "scanning" should read -- scannings --.

Column 5,
Line 2, "pass" should read -- passes --; and
Line 51, "Reference" should read -- reference --.

Column 6,
Line 21, "Reference" should read -- reference --;
Lines 24 and 53, "ink." should read -- inks. --;
Lines 55 and 56, "color" should read -- colors --; and
Line 57, "amount" should read -- amounts --.

Column 7,
Line 4, "amount" should read -- amounts --.

Column 9,
Line 23, "the all" should read -- all the -- ;
Line 25, "above described" should read -- above-described --; and
Line 62, "(modulate)" should read -- (modulates) --.

Column 10,
Line 59, "pass." should read -- passes --.

Column 11,
Line 4, "This" should start a new paragraph; and
Line 40, "scanning (three pass)." should read -- scanning (three passes) --.

Column 12,
Line 5, "from" should read -- it from --; and
Line 44, "pass" should read -- passes --.

UNITED STATES PATENT AND TRADEMARK OFFICE
CERTIFICATE OF CORRECTION

PATENT NO.    : 6,305,775 B1
DATED         : October 23, 2001
INVENTOR(S)   : Naoji Ohtsuka et al.

It is certified that error appears in the above-identified patent and that said Letters Patent is hereby corrected as shown below:

<u>Column 13,</u>
Line 18, "bit)" should read -- bits) --.

<u>Column 17,</u>
Line 36, "is" should read -- are --.

Signed and Sealed this

Twenty-eighth Day of May, 2002

*Attest:*

*Attesting Officer*

JAMES E. ROGAN
*Director of the United States Patent and Trademark Office*